(12) United States Patent
Yanagawa et al.

(10) Patent No.: US 10,011,729 B2
(45) Date of Patent: Jul. 3, 2018

(54) INK, METHOD FOR PRODUCING INK, INK STORAGE CONTAINER, RECORDING DEVICE, AND RECORDING METHOD

(71) Applicants: Yoshiki Yanagawa, Kanagawa (JP);
Takuya Yamazaki, Shizuoka (JP);
Takahiro Yoshida, Ibaraki (JP)

(72) Inventors: Yoshiki Yanagawa, Kanagawa (JP);
Takuya Yamazaki, Shizuoka (JP);
Takahiro Yoshida, Ibaraki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/601,283

(22) Filed: May 22, 2017

(65) Prior Publication Data
US 2017/0342286 A1 Nov. 30, 2017

(30) Foreign Application Priority Data

May 26, 2016 (JP) ................................. 2016-105052
Sep. 6, 2016 (JP) ................................. 2016-173907
Dec. 21, 2016 (JP) ................................. 2016-247626

(51) Int. Cl.
*C09D 11/322* (2014.01)
*C09D 11/32* (2014.01)
*C09D 11/326* (2014.01)
*B41J 2/015* (2006.01)
*B41J 2/135* (2006.01)
*B41J 2/315* (2006.01)
*C09D 11/324* (2014.01)
*C09D 11/02* (2014.01)

(52) U.S. Cl.
CPC ............. *C09D 11/322* (2013.01); *B41J 2/315* (2013.01); *C09D 11/02* (2013.01); *C09D 11/32* (2013.01); *C09D 11/324* (2013.01); *C09D 11/326* (2013.01)

(58) Field of Classification Search
CPC ..... C09D 11/322; C09D 11/32; C09D 11/326; B41J 2/015; B41J 2/135; B41J 2/315
USPC .......................................... 106/31.77, 31.43
See application file for complete search history.

(56) References Cited

U.S. PATENT DOCUMENTS

| | | | |
|---|---|---|---|
| 9,815,986 B2 * | 11/2017 | Kido .................... | C09D 11/322 |
| 2015/0035896 A1 * | 2/2015 | Gotou ................... | C09D 11/322 347/20 |
| 2016/0017075 A1 | 1/2016 | Harada et al. | |
| 2016/0102162 A1 | 4/2016 | Harada et al. | |
| 2016/0130452 A1 | 5/2016 | Katoh et al. | |
| 2016/0168292 A1 | 6/2016 | Fukuoka et al. | |
| 2016/0222234 A1 | 8/2016 | Matsuyama et al. | |
| 2016/0264808 A1 * | 9/2016 | Kido .................... | C09D 11/322 |
| 2016/0333208 A1 | 11/2016 | Gotou et al. | |
| 2016/0362572 A1 | 12/2016 | Matsuyama et al. | |
| 2017/0073533 A1 | 3/2017 | Fukuoka et al. | |
| 2017/0121544 A1 | 5/2017 | Koizuka et al. | |
| 2017/0158794 A1 * | 6/2017 | Harada ................ | C09D 11/107 |
| 2017/0174918 A1 * | 6/2017 | Yanagawa ............ | C09D 11/322 |
| 2017/0174919 A1 * | 6/2017 | Kido ....................... | C09D 11/36 |

FOREIGN PATENT DOCUMENTS

| JP | 2008-069355 | 3/2008 |
| JP | 2011-144348 | 7/2011 |
| JP | 2016-216701 | 12/2016 |

OTHER PUBLICATIONS

U.S. Appl. No. 15/366,526, filed Dec. 1, 2016.
U.S. Appl. No. 15/373,523, filed Dec. 9, 2016.
Robert F. Fedors, "A method for estimating both the solubility parameters and molar volumes of liquids" Polymer Engineering and Science, 1974, vol. 14, No. 2, 147-154.
Imoto Minoru, "Basic Theory of Gluing", Macromolecule Publication Meeting, 1999, pp. 89-103 (with English Abstract).

\* cited by examiner

*Primary Examiner* — Helene Klemanski
(74) *Attorney, Agent, or Firm* — Oblon, McClelland, Maier & Neustadt, L.L.P.

(57) ABSTRACT

An ink is provided. The ink includes a quinacridone pigment and an organic solvent having a solubility parameter of from 9.00 to 11.80 in an amount of from 30% to 60% by mass of total mass of the ink. Both a viscosity change rate and a particle diameter change rate of the ink, before and after the ink is heated at 80° C. for 4 weeks in a sealed state, are in the range of from −5% to 1%.

16 Claims, 9 Drawing Sheets

INK, METHOD FOR PRODUCING INK, INK STORAGE CONTAINER, RECORDING DEVICE, AND RECORDING METHOD

CROSS-REFERENCE TO RELATED APPLICATIONS

This patent application is based on and claims priority pursuant to 35 U.S.C. § 119(a) to Japanese Patent Application Nos. 2016-105052, 2016-173907, and 2016-247626, filed on May 26, 2016, Sep. 6, 2016, and Dec. 21, 2016, respectively, in the Japan Patent Office, the entire disclosure of each which is hereby incorporated by reference herein.

BACKGROUND

Technical Field

The present disclosure relates to an ink, a method for producing an ink, an ink storage container, a recording device, and a recording method.

Description of the Related Art

Inkjet recording methods have advantages such that the process is simple and full colorization is easy in comparison with other recording methods. Therefore, high definition images can be obtained by a device having a simple configuration. For this reason, the inkjet recording is widely diffusing from home use to office use, commercial printing, and industrial printing. In such an inkjet recording method, aqueous ink compositions using a water soluble dye as colorant are commonly used. However, its water resistance and light resistance are inferior so that pigment ink using a water insoluble pigment is under development to substitute the water soluble dye.

For inkjet printing for office use, typically plain paper is used as a recording medium and high image density is demanded. In general, when images are printed on plain paper using pigment ink, the pigment ink does not stay on the surface of the paper but permeates the paper, so that the pigment density on the surface decreases and consequently the image density lowers. The image density increases if the pigment concentration in the ink is increased. However, the ink becomes viscous, thereby degrading the discharging stability of the ink.

In attempting to improve the printing speed, one proposed technique involves adding a permeating agent, such as a hydrophobic solvent, to an ink. The ink is caused to permeate a recording medium, thus speeding up drying of the ink attached to the recording medium. This technique for improving printing speed is also advantageous in terms of improvement of image quality, because as the permeating agent (e.g., a hydrophobic solvent) quickly permeates a recording medium, the occurrence of beading (a phenomenon in that ink droplets in adjacent dots coalesce) and blurring at color boundaries is suppressed. Therefore, pigments are required to have high dispersion stability even in such inks containing hydrophobic solvent in large amount.

SUMMARY

In accordance with some embodiments of the present invention, an ink is provided. The ink includes a quinacridone pigment and an organic solvent having a solubility parameter of from 9.00 to 11.80 in an amount of from 30% to 60% by mass of total mass of the ink. Both a viscosity change rate and a particle diameter change rate of the ink, before and after the ink is heated at 80° C. for 4 weeks in a sealed state, are in the range of from −5% to 1%.

In accordance with some embodiments of the present invention, a method for producing an ink is provided. The method includes heating a raw material mixture of the ink, and the raw material mixture includes a quinacridone pigment and an organic solvent having a solubility parameter of from 9.00 to 11.80.

In accordance with some embodiments of the present invention, an ink storage container is provided. The ink storage container includes a container and the above ink stored in the container.

In accordance with some embodiments of the present invention, a recording device is provided. The recording device includes an ink discharger to discharge the above ink onto a recording medium to record information or an image on the recording medium.

In accordance with some embodiments of the present invention, a recording method is provided. The recording method includes applying a stimulus to the above ink through an ink discharger and discharging the ink from the ink discharger to record information or an image on a recording medium.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
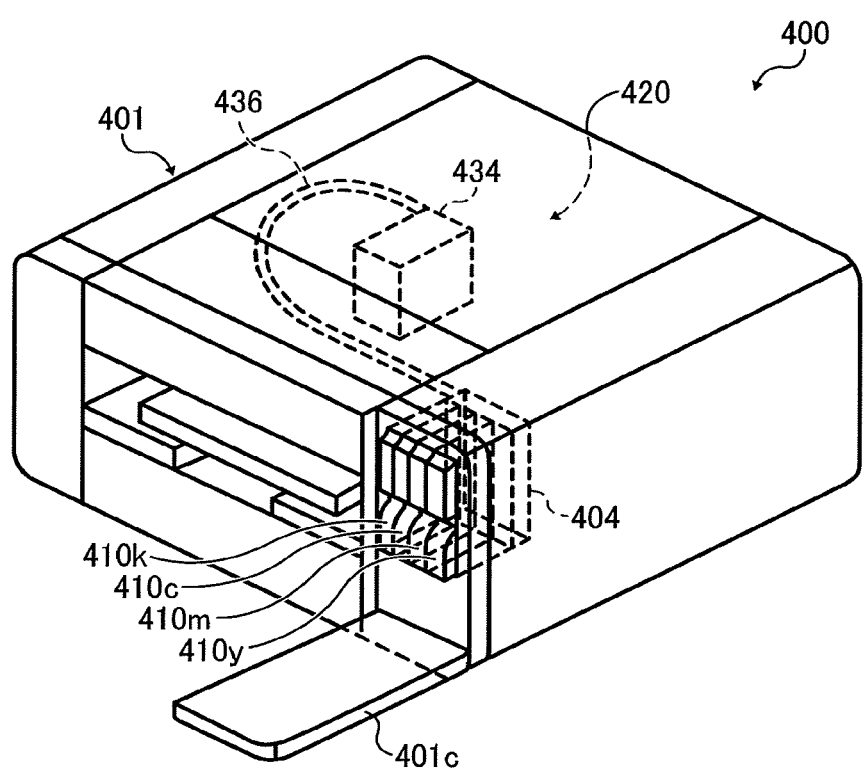
FIG. 1 is a schematic perspective view of a recording device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

With respect to conventional magenta inks, storage stability has been generally insufficient. In particular, when used in combination with a line head type printer, liquid droplets of the ink may be discharged in a curved manner or ink clogging may occur after the printer is left at rest for a long time, because the nozzle surface of the inkjet head cannot be capped, even though the line head type printer is advantageous in terms of speedup of printing.

Accordingly, one object of the present invention is to provide an ink that is excellent in storage stability and discharge stability and is capable of forming high-quality images without causing beading.

In accordance with some embodiments of the present invention, an ink is provided that is excellent in storage stability and discharge stability and is capable of forming high-quality images without causing beading.

Incidentally, it is to be noted that the following embodiments are not limiting the present disclosure and any deletion, addition, modification, change, etc. can be made within a scope in which man in the art can conceive including other embodiments, and any of which is included within the scope of the present disclosure as long as the effect and feature of the present disclosure are demonstrated.

An ink according to an embodiment of the present invention includes an organic solvent having a solubility parameter of from 9.00 to 11.80 in an amount of from 30% to 60% by mass of total mass of the ink. This means that the ink includes a hydrophobic solvent in large amount. The large amount of the hydrophobic solvent improves permeation speed of the ink on a surface of paper, thus suppressing coalescence of ink droplets in adjacent dots on the surface of a paper sheet (i.e., beading) and image blurring at color boundaries.

In addition, when the ink is heated at 80° C. for 4 weeks in a sealed state, both a viscosity change rate and a particle diameter change rate of the ink are in the range of from −5% to 1% before and after the heating. This means that the ink is excellent in storage stability and discharge stability.

The particle diameter charge rate here refers to a charge rate in 90% cumulative volume average particle diameter (D90) of solid contents in the ink. Preferably, a charge rate in 50% cumulative volume average particle diameter (D50) of solid contents in the ink is also in the range of from −5% to 1%.

During the heating of the ink, specifically, the ink is sealed in a container with a lid and a piece of sealing tape attached to the boundary between the container and the lid, so that volatilization of the ink is suppressed.

Generally, in an ink including a hydrophobic solvent in large amount, dispersion stability of pigments deteriorate. In particular, quinacridone pigments notably degrade their dispersion stability in such an ink. By contrast, the ink according to some embodiments of the present invention provides high degrees of storage stability and discharge stability even though a large amount of a hydrophobic solvent is included. In particular, high degrees of storage stability and discharge stability are achieved by proper selection of pigment, synergist, and dispersant to be included in the ink, and employment of the heating treatment. Since the types of pigment, synergist, and dispersant have been properly selected, the dispersant can strongly adsorb to the surface of the pigment. In addition, owing to the heating treatment, steric conformation of hydrophobic and hydrophilic sites in the dispersant has been optimized. Therefore, even though the ink includes a hydrophobic solvent in large amount, the pigment can exhibit high dispersion stability in the ink, and the ink can provide excellent storage stability and discharge stability.

Each composition of the ink is described in detail below.

Ink

Compositional materials of the ink (e.g., organic solvent, water, colorant, resin, and other additives) are described in detail below.

Organic Solvent

The ink according to an embodiment of the present invention includes an organic solvent having a solubility parameter of from 9.00 to 11.80 in an amount of from 30% to 60% by mass of total mass of the ink, for the purpose of improving image quality.

When an organic solvent having a solubility parameter of less than 9.00 is used, dispersion stability of quinacridone pigments deteriorates because such an organic solvent is excessively hydrophobic. When an organic solvent having a solubility parameter in excess of 11.80 is used, defective images including beading and blurring may be produced because hydrophobicity of such an organic solvent is too low to speed up permeation speed of the ink on the surface of a paper sheet. When the amount of the organic solvent is in excess of 60% by mass, dispersion stability of pigments may deteriorate. When the amount of the organic solvent is less than 30% by mass, detective image may be generated.

The solubility parameter refers to a numerical value indicating solvency behavior of one material to another material. The solubility parameter is represented by the square root of the cohesive energy density (CED) that indicates an intermolecular attracting force. The cohesive energy density is the amount of energy needed for vaporizing 1 mL of a material.

The solubility parameter (SP) is defined by the regular solution theory introduced by Hildebrand. The solubility parameter indicates the solubility of a two-component system solution. The solubility parameter can be calculated in various ways. In the present disclosure, the solubility parameter is calculated from the following formula (B) based on the Fedors' method widely used.

$$\text{Solubility Parameter}(SP) = (CED)^{1/2} = (E/V)^{1/2} \qquad \text{Formula (B)}$$

In the formula (B), E represents molecular cohesive energy (cal/mol) and V represents molecular volume (cm³/mol). E and V are represented by the following formulae (C)

and (D), respectively, where Δei and Δvi respectively represent vaporization energy and molar volume of an atomic group.

$$E = \Sigma \Delta ei \quad \text{Formula (C)}$$

$$V = \Sigma \Delta vi \quad \text{Formula (D)}$$

Detail of the above calculation method and data of vaporization energy Δei and molar volume Δvi are available in a publication "Imoto, Minoru. *Basic Theory of Gluing*, Macromolecule Publication Meeting, pp. 89-103". Data unavailable in this publication, such as data for —CF$_3$ group, may be obtained from a document "Fedors, Robert F. *Polymer Engineering and Science*, 1974, Vol. 14, No. 2, 147-154".

The unit for the solubility parameter is $(cal/cm^3)^{1/2}$.

Specific examples of the organic solvents having a solubility parameter of from 9.00 to 11.80 include, but are not limited to, the following materials (SP is indicated in each brackets):

3-butoxy-N,N-dimethylpropanamide (9.03), N,N-dimethyl-3-propanamide (9.08), 3-ethoxy-N,N-dimethylpropanamide (9.13), 3-methoxy-N,N-dimethylpropanamide (9.19), 3-methoxy-3-methylbutanol (9.64), diethylene glycol monohexyl ether (9.66), triethylene glycol monobutyl ether (9.77), 3-methyl-1-butanol (9.79), 1-propoxy-2-propanol (9.82), di ethylene glycol monobutyl ether (9.86), 3-methoxy-1-butanol (9.98), 2-butanol (9.98), ethylene glycol monobutyl ether (9.99), 1-pentanol (9.99), diethylene glycol monoethyl ether (10.14), 1-methoxy-2-propanol (10.19), 1-butanol (10.21), 2-propanol (10.24), 1-propanol (10.52), 1-methyl-2-pyrrolidone (10.84), ethanol (10.96), δ-valerolactone (11.06), 3-ethyl-3-oxetanemethanol (11.31), tetraethylene glycol (11.58), γ-butyrolactone (11.62), methanol (11.68), and 3-methyl-3-oxetanemethanol (11.79).

Among these organic solvents, 3-butoxy-N,N-dimethylpropanamide, N,N-dimethyl-3-propanamide, 3-ethoxy-N,N-dimethylpropanamide, 3-methoxy-N,N-dimethylpropanamide, 3-ethyl-3-oxetanemethanol, and 3-methyl-3-oxetanemethanol are preferable, from the aspect of achieving a good balance between storage stability and high-quality image forming ability. Each of these organic solvents can be used alone or in combination with others. Preferably, the content rate of the organic solvent having a solubility parameter of from 9.00 to 11.80 in the ink is in the range of from 30% to 60% by mass, more preferably from 40% to 50% by mass.

In addition to the organic solvent having a solubility parameter of from 9.00 to 11.80 selected from 3-butoxy-N,N-dimethylpropanamide, N,N-dimethyl-3-propanamide, 3-ethoxy-N,N-dimethylpropanamide, 3-methoxy-N,N-dimethylpropanamide, 3-ethyl-3-oxetanemethanol, and 3-methyl-3-oxetanemethanol, the ink may further include an alkanediol (including a cycloalkanediol) having 5 to 7 carbon atoms.

Specific examples of the alkanediol having 5 to 7 carbon atoms include, but are not limited to, 1,2-pentanediol, 1,3-pentanediol, 1,4-pentanediol, 1,5-pentanediol, 2,3-pentanediol, 2,4-pentanediol, 1,2-cyclopentanediol, 1,3-cyclopentanediol, 2-ethyl-1,3-propanediol, 2-methyl-1,4-butanediol, 3-methyl-1,2-butanediol, 3-methyl-1,3-butanediol, 1,2-hexanediol, 1,3-hexanediol, 1,4-hexanediol, 1,5-hexanediol, 1,6-hexanediol, 2,3-hexanediol, 2,4-hexanediol, 2,5-hexanediol, 3,4-hexanediol, 1,2-cyclohexanediol, 1,3-cyclohexanediol, 1,4-cyclohexanediol, 4-methyl-1,2-pentanediol, 4-methyl-1,3-pentanediol, 4-methyl-1,4-pentanediol, 2-methyl-1,5-pentanediol, 2-propyl-1,3-propanediol, 3-methyl-1,2-pentanediol, 3-methyl-1,3-pentanediol, 3-methyl-1,4-pentanediol, 3-methyl-1,5-pentanediol, 3-methyl-2,4-pentanediol, 3-ethyl-1,2-butanediol, 3-ethyl-1,3-butanediol, 3-ethyl-1,4-butanediol, 2,3-dimethyl-1,2-butanediol, 2,3-dimethyl-1,3-butanediol, 2,3-dimethyl-1,4-butanediol, 2,3-dimethyl-2,3-butanediol, 1,2-heptanediol, 1,3-heptanediol, 1,4-heptanediol, 1,5-heptanediol, 1,6-heptanediol, 1,7-heptanediol, 2,3-heptanediol, 2,4-heptanediol, 2,5-heptanediol, 2,6-heptanediol, 3,4-heptanediol, 3,5-heptanediol, 2-methyl-1,2-hexanediol, 2-methyl-1,3-hexanediol, 2-methyl-1,4-hexanediol, 2-methyl-1,5-hexanediol, 2-methyl-1,6-hexanediol, 3-methyl-1,2-hexanediol, 3-methyl-1,3-hexanediol, 3-methyl-1,4-hexanediol, 3-methyl-1,5-hexanediol, 3-methyl-1,6-hexanediol, 2,3-dimethyl-1,2-pentanediol, 2,3-dimethyl-1,3-pentanediol, 2,3-dimethyl-1,4-pentanediol, 2,3-dimethyl-1,5-pentanediol, 2,4-dimethyl-1,2-pentanediol, 2,4-dimethyl-1,3-pentanediol, 2,4-dimethyl-1,4-pentanediol, and 2,4-dimethyl-1,5-pentanediol. In particular, alkanediols having 6 carbon atoms are preferable. By including such an alkanediol, the ink can provide sufficient discharge stability and storage stability even when used in combination with a line head inkjet printer, the surface of the nozzle plate of which cannot be capped, or a circulation discharge type head that is easy to volatilize moisture in inks. The reason is considered that hydrophobic groups and hydrophilic groups can remain balanced in the dispersant owing to the presence of the alkanediol. In particular, the alkanediol is considered to adjust the lengths of hydrophilic chains (e.g., a polyoxyethylene structure) in the dispersant. Thus, even when pigment particles come close to each other as moisture evaporates from the ink, hydrophilic chains of the dispersant that are extending from the surface of the pigment particles do not get tangled for the proper lengths thereof. For this reason, the ink can provide excellent storage stability and discharge stability for an extended period of time.

Preferably, the content rate of the alkanediol having 5 to 7 carbon atoms in the ink is in the range of from 5% to 30% by mass.

The solubility parameter of the alkanediol having 5 to 7 carbon atoms may be either in the range of from 9.00 to 11.80 or beyond this range. When the solubility parameter of the alkanediol having 5 to 7 carbon atoms is in the range of from 9.00 to 11.80, the content of the alkanediol having 5 to 7 carbon atoms is included in the content of the organic solvent having a solubility parameter of from 9.00 to 11.80.

The ink may further include an organic solvent other than the organic solvent having a solubility parameter of from 9.00 to 11.80 and the alkanediol having 5 to 7 carbon atoms.

There is no specific limitation on the type of the other organic solvent. For example, water-soluble organic solvents can be used. Usable water-soluble organic solvents include polyols, ethers (e.g., polyol alkyl ethers, polyol aryl ethers), nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, triethylene glycol, polyethylene glycol, polypropylene glycol, glycerin, 1,2,6-hexanetriol, ethyl-1,2,4-butanetriol, 1,2,3-butanetriol, 2,2,4-trimethyl-1,3-pentanediol, and 3-methyl-1,3,5-pentanetriol; polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyol aryl ethers such as ethylene glycol monophenyl ether and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate; and ethylene carbonate.

In particular, organic solvents having a boiling point of 250° C. or less are preferable, since they can function as a wetting agent while providing good drying property.

In addition, polyol compounds having 8 or more carbon atoms and glycol ether compounds are also preferable. Specific examples of the polyol compounds having 8 or more carbon atoms include, but are not limited to, 2-ethyl-1,3-hexanediol and 2,2,4-trimethyl-1,3-pentanediol.

Specific examples of the glycol ether compounds include, but are not limited to, polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether; and polyol aryl ethers such as ethylene glycol monophenyl ether and ethylene glycol monobenzyl ether.

In particular, polyol compounds having 8 or more carbon atoms and glycol ether compounds, exemplified above, are capable of improving paper-permeability of the ink, which is advantageous when the ink is printed on a recording medium made of paper.

Preferably, the content rate of the organic solvent in the ink is in the range of from 30% to 60% by mass, more preferably from 35% to 60% by mass, from the aspects of drying property and discharge reliability of the ink.

Water

Preferably, the content rate of water in the ink is in the range of from 30% to 65% by mass, more preferably from 35% to 55% by mass, from the aspects of drying property and discharge reliability of the ink.

Colorant

The ink according to an embodiment of the present invention includes a quinacridone pigment as a colorant, in view of color gamut and fade resistance.

The quinacridone pigment may or may not have a substituent. Specific examples of the substituent include, but are not limited to, methyl group, chloro group, and methoxy group. Specific examples of the quinacridone pigment include, but are not limited to, C.I. Pigment Red 122 (2,9-dimethylquinacridone), C.I. Pigment Red 202 (2,9-dichloroquinacridone), C.I. Pigment Red 206, C.I. Pigment Red 207, C.I. Pigment Red 209 (3,10-dichloroquinacridone), C.I. Pigment Violet 19 (unsubstituted quinacridone), 3,10-dimethylquinacridone, 3,10-dichloroquinacridone, 3,10-dimethoxyquinacridone, 4,11-dimethylquinacridone, 4,11-dichloroquinacridone, 4,11-dimethoxyquinacridone, and quinacridone quinone. Each of these quinacridone pigments can be used alone. In particular, C.I. Pigment Red 122, C.I. Pigment Red 202, C.I. Pigment Red 209, and C.I. Pigment Violet 19 are preferable from the aspects of color hue and dispersion stability.

Also, two or more of the above quinacridone pigments can be used in combination in accordance with the intended purpose, such as enlargement of the color gamut. For example, combinations of at least two of the following quinacridone pigments are preferable: unsubstituted quinacridone pigments, dimethyl quinacridone pigments, and dichloroquinacridone pigments. More specifically, combinations of at least two of C.I. Pigment Red 122, C.I. Pigment Red 202, C.I. Pigment Red 209, and C.I. Pigment Violet 19 are preferable. The combination may be in any shape or form (e.g., mixture, solid liquid).

Since quinacridone pigments have an anisotropic crystal structure, it is generally difficult to strongly adsorb a dispersant to the whole surface of the pigment. Therefore, quinacridone pigments generally provide poor dispersion stability. By contrast, the ink according to an embodiment of the present invention provides high degrees of storage stability and discharge stability by including a synergist and a dispersant and employing a heating treatment. Since the types of pigment, synergist, and dispersant have been properly selected, the dispersant can strongly adsorb to the surface of the pigment. In addition, owing to the heating treatment, steric conformation of hydrophobic and hydrophilic sites in the dispersant has been optimized. Therefore, even though the ink includes a hydrophobic solvent in large amount, the pigment can exhibit high dispersion stability in the ink, and the ink can provide excellent storage stability and discharge stability.

Preferably, the content rate of the quinacridone pigment in the ink is in the range of from 0.1% to 15% by mass, more preferably from 1% to 10% by mass, for improving image density, fixing strength, and discharge stability.

The quinacridone pigment may be used in combination with another colorant. Usable colorants include pigments and dyes. Usable pigments include both inorganic pigments and organic pigments. One colorant can be used alone, or two or more colorants can be used in combination. Mixed crystals can also be used as colorants.

Usable pigments include black pigments, yellow pigments, magenta pigments, cyan pigments, white pigments, green pigments, orange pigments, glossy color pigments (e.g., gold pigments, silver pigments), and metallic pigments. Specific examples of inorganic pigments include, but are not limited to, titanium oxide, iron oxide, calcium carbonate, barium sulfate, aluminum hydroxide, barium yellow, cadmium red, chrome yellow, and carbon black produced by a known method, such as a contact method, a furnace method, and a thermal method.

Specific examples of organic pigments include, but are not limited to, azo pigments, polycyclic pigments (e.g., phthalocyanine pigments, perylene pigments, perinone pigments, anthraquinone pigments, dioxazine pigments, indigo pigments, thioindigo pigments, isoindolinone pigments, quinophthalone pigments), dye chelates (e.g., basic dye chelate, acid dye chelate), nitro pigments, nitroso pigments, and aniline black.

Among these pigments, those having good affinity for solvents are preferable. In addition, resin hollow particles and inorganic hollow particles can also be used.

Specific examples of pigments used for black-and-white printing include, but are not limited to: carbon blacks (i.e., C.I. Pigment Black 7) such as furnace black, lamp black, acetylene black, and channel black; metals such as copper, iron (i.e., C.I. Pigment Black 11), and titanium oxide; and organic pigments such as aniline black (i.e., C.I. Pigment Black 1).

Specific examples of pigments used for color printing include, but are not limited to: C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (red iron oxide), 104, 105, 106, 108 (cadmium red), 112, 114, 122 (quinacridone magenta), 123, 146, 149, 166, 168, 170, 172, 177, 178, 179, 184, 185, 190, 193, 202, 207, 208, 209, 213, 219, 224, 254, and 264; C.I. Pigment Violet 1 (rhodamine lake), 3, 5:1, 16, 19, 23, and 38; C.I. Pigment Blue 1,2,15 (phthalocyanine blue), 15:1, 15:2, 15:3, 15:4 (phthalocyanine blue), 16, 17:1, 56, 60, and 63; and C.I. Pigment Green 1,4,7,8,10,17,18, and 36.

Usable dyes include acid dyes, direct dyes, reactive dyes, and basic dyes. Two or more of these dyes can be used in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

Preferably, the content rate of the colorant in the ink is in the range of from 0.1% to 15% by mass, more preferably from 1% to 10% by mass, for improving image density, fixing strength, and discharge stability.

The pigment can be dispersed in the ink by any of the following methods: introducing a hydrophilic functional group to the pigment to make the pigment self-dispersible; covering the surface of the pigment with a resin; and dispersing the pigment by a dispersant. In the method of introducing a hydrophilic functional group to the pigment to make the pigment self-dispersible, for example, a functional group such as sulfone group and carboxyl group may be introduced to the pigment to make the pigment dispersible in water. Such a self-dispersing pigment may be used alone. Alternatively, a pigment to which no hydrophilic functional group is introduced may be used in combination with a synergist. Preferably, the quinacridone pigment according to some embodiments of the present invention is used in combination with a sulfonic acid derivative of quinacridone as a synergist.

The synergist refers to a pigment derivative having a polar group (e.g., acidic group, basic group) introduced to the pigment backbone thereof. The synergist adsorbs to the surface of the pigment by π-π stacking or hydrophobic interaction to reform the surface of the pigment to be acidic or basic. As a result, electrostatic repulsion between the pigment particles becomes much larger, thereby enhancing dispersion stability of the pigment particles. In addition, an electrostatic adsorptive force of the pigment to hydrophilic sites (e.g., acidic group, basic group) of the dispersant is increased, so that the dispersant can strongly adsorb to the surface of the pigment via the synergist. Thus, dispersion stability of the pigment particles is improved by not only electrostatic repulsion but also steric hindrance of the pigment particles. The pigment backbone of the synergist may be a backbone of azo pigment, phthalocyanine pigment, quinacridone pigment, perylene pigment, isoindoline pigment, benzimidazolone pigment, pyranthrone pigment, thioindigo pigment, or quinophthalone pigment.

Specific examples of the polar group include, but are not limited to, alkylamino groups, carboxyl groups, sulfonic acid groups, and phthalimide groups. Specific examples of the synergist include, but are not limited to, SOLSPERSE 5000, SOLSPERSE 12000, and SOLSPERSE 22000 (commercially available from Lubrizol Japan Limited). In the present embodiment, for the purpose of improving adsorptive power to the quinacridone pigment, preferably, the synergist has a quinacridone pigment backbone. Preferably, the synergist has a sulfonic acid group as a polar group, since sulfonic acid group is easy to introduce. More preferably, the synergist is a sulfonic acid derivative of quinacridone.

Preferably, the content rate of the synergist in the ink is in the range of from 0.1% to 10% by mass, more preferably from 1% to 5% by mass, from the aspects of discharge stability, color gamut, and color reproducibility.

In the method of covering the surface of the pigment with a resin, for example, the pigment may be incorporated in a microcapsule to make the pigment self-dispersible in water. In this case, the pigment may be referred to as a resin-covered pigment. In this case, not all the pigment particles included in the ink should be covered with a resin. It is possible that a part of the pigment particles are not covered with any resin or partially covered with a resin.

In the method of dispersing the pigment by a dispersant, low-molecular-weight dispersants and polymeric dispersants, represented by known surfactants, may be used. Polymeric dispersants are more preferable in terms of dispersion stability.

Specific examples of the polymeric dispersants include, but are not limited to, DISPERBYK-102, DISPERBYK-103, DISPERBYK-106, DISPERBYK-107, DISPERBYK-108, DISPERBYK-109, DISPERBYK-110, DISPERBYK-111, DISPERBYK-115, DISPERBYK-118, DISPERBYK-140, DISPERBYK-142, DISPERBYK-145, DISPERBYK-161, DISPERBYK-162, DISPERBYK-163, DISPERBYK-164, DISPERBYK-166, DISPERBYK-167, DISPERBYK-168, DISPERBYK-170, DISPERBYK-171, DISPERBYK-180, DISPERBYK-181, DISPERBYK-182, DISPERBYK-184, DISPERBYK-185, DISPERBYK-187, DISPERBYK-190, DISPERBYK-191, DISPERBYK-192, DISPERBYK-193, DISPERBYK-194N, DISPERBYK-199, DISPERBYK-2000, DISPERBYK-2001, DISPERBYK-2008, DISPERBYK-2009, DISPERBYK-2010, DISPERBYK-2012, DISPERBYK-2013, DISPERBYK-2015, DISPERBYK-2022, DISPERBYK-2025, DISPERBYK-2026, DISPERBYK-2050, DISPERBYK-2051, DISPERBYK-2052, DISPERBYK-2055, DISPERBYK-2063, DISPERBYK-2064, DISPERBYK-2200, BYKJET-9131, BYKJET-9132, BYKJET-9133, BYKJET-9142, BYKJET-9150, BYKJET-9151, BYKJET-9152, and BYKJET-9170 (available from BYK-Chemie); and Dispex® AA 4040 NS (formerly Dispex® A40), Dispex® AA 4140 NS, Dispex® AA 4144 (formerly Hydropalat® 44), Dispex® CX 4240 (formerly Dispex® GA40), Dispex® CX 4320 (formerly Pigment Disperser® MD20), Dispex® CX 4325 (formerly Dispex® HDN), Dispex® CX 4340 (formerly Dispex® G40), Dispex® CX 4910 (formerly Dispex® N100), Dispex® Ultra FA 4404 (formerly Hydropalat® 3204), Dispex® Ultra FA 4420 (formerly Efka® 6220), Dispex® Ultra FA 4425 (formerly Efka® 6225), Dispex® Ultra FA 4431 (formerly Efka® 6230), Dispex® Ultra FA 4436 (formerly Hydropalat® 3216), Dispex® Ultra FA 4480 NU (formerly Hydropalat® 1080), Dispex® Ultra PA 4501 (formerly Efka® 1501), Dispex® Ultra PA 4503 (formerly Efka® 1503), Dispex® Ultra PA 4510 (formerly Efka® 4510), Dispex® Ultra PA 4530 (formerly Efka® 4530), Dispex® Ultra PA 4550 (formerly Efka® 4550), Dispex® Ultra PA 4560 (formerly Efka® 4560), Dispex® PA 4570 (formerly Efka® 4570), Dispex® Ultra PA 4580 (formerly Efka®

4580), Dispex® Ultra PA 4590 (formerly Efka® 4590), Dispex® Ultra PA 7441 (formerly Efka® 7441), and Dispex® Ultra PX 4585 (formerly Efka® 4585) (available from BASF).

Each of these polymeric dispersants can be used alone or in combination with others. In particular, polymeric dispersants having a polyoxyethylene structure are preferable in terms of dispersion stability. The above-described dispersing methods may be employed in combination. From the aspect of dispersion stability, the method of dispersing a pigment having a hydrophilic functional group with a dispersant and the method of dispersing a pigment having no hydrophilic functional group with a synergist and a dispersant are preferable.

In view of adsorptive powers of the synergist and the dispersant to the pigment, preferably, the mass ratio among the pigment, the synergist, and the dispersant (i.e., pigment/synergist/dispersant) is (70 to 100)/(0.1 to 20)/(5 to 100), more preferably (75 to 95)/(0.5 to 15)/(7.5 to 75), and most preferably (80 to 90)/(1 to 10)/(10 to 50).

The ink according to an embodiment of the present invention may be produced by a method including a process of heating a raw material mixture of the ink including the quinacridone pigment and the organic solvent having a solubility parameter of from 9.00 to 11.80. The heating treatment may be performed by any known means, such as a heater. In view of compositional fluctuation and dispersion stability, preferably, the heating treatment is performed in a sealed state so that volatilization of the ink is suppressed.

Owing to employment the heating treatment and the presence of the synergist, the ink can disperse the quinacridone pigment with a high degree of stability even though the ink includes a large amount of, i.e., from 30% to 60% by mass of, the organic solvent having a solubility parameter of from 9.00 to 11.80. Preferably, the dispersant included in the ink is a polymeric dispersant having a hydrophilic site. More preferably, the hydrophilic site has a polyoxyethylene structure. Through the heating treatment, steric conformation of hydrophobic and hydrophilic sites in the dispersant are optimized. In a case in which the hydrophilic site has a polyoxyethylene structure, although the polyoxyethylene structure is lowered in hydrophilicity through the heating treatment, the lengths of hydrophobic chains are thereby properly shortened. Thus, interaction between the dispersant molecules adsorbed to the surface of the quinacridone pigment is lowered and a high degree of dispersion stability of the quinacridone pigment is achieved.

The ink can be obtained by mixing the colorant with other materials such as water and the organic solvent. The ink can also be obtained by, first, preparing a pigment dispersion by mixing the pigment with water, the dispersant, etc., and thereafter mixing the pigment dispersion with other materials such as water and the organic solvent. The pigment dispersion includes water, the pigment, the pigment dispersant, and other components, if any. The pigment is dispersed in the pigment dispersion with the adjusted particle diameter. Preferably, the pigment dispersion is prepared with a disperser. Preferably, the pigment dispersed in the pigment dispersion has a maximum frequency particle diameter in the range of from 20 to 500 nm, more preferably from 20 to 150 nm, based on the number of pigment particles, from the aspects of dispersion stability of the pigment and discharge stability and image quality (e.g., image density) of the ink.

The particle diameter of the pigment can be measured with a particle size distribution analyzer (NANOTRAC WAVE-UT151 available from MicrotracBEL Corp.). Preferably, the content rate of the pigment in the pigment dispersion is in the range of from 0.1% to 50% by mass, more preferably from 0.1% to 30% by mass, from the aspects of discharge stability and image density.

Preferably, the pigment dispersion may be subjected to filtration using a filter or a centrifugal separator to remove coarse particles, and thereafter to degassing. Preferably, the ink according to an embodiment of the present invention is subjected to a heating treatment for improving dispersion stability. The heating treatment condition is properly controlled depending on the materials in the ink. Preferably, the heating temperature is in the range of from 25° C. to 100° C., more preferably from 40° C. to 70° C. The heating time ranges from several minutes to 10 days, preferably from one hour to one day. The heating treatment makes it possible to more stabilize ink properties.

Resin

The ink may include a resin. Specific examples the resin include, but are not limited to, urethane resins, polyester resins, acrylic resins, vinyl acetate resins, styrene resins, butadiene resins, styrene-butadiene resins, vinyl chloride resins, acrylic styrene resins, and acrylic silicone resins.

Such resins may be in the form of particles. The ink can be obtained by mixing a resin emulsion, in which resin particles are dispersed in water, with other materials such as a colorant and an organic solvent. These resin particles are available either synthetically or commercially. The resin particles may include one type or two or more types of resin particles.

The volume average particle diameter of the resin particles is not particularly limited and can be suitably selected to suit to a particular application. Preferably, the volume average particle diameter is in the range of from 10 to 1,000 nm, more preferably from 10 to 200 nm, and most preferably from 10 to 100 nm, to obtain good fixability and image hardness.

The volume average particle diameter of the resin particles can be measured with a particle size distribution analyzer (NANOTRAC WAVE-UT151 available from MicrotracBEL Corp.).

Preferably, the content rate of the resin particles in the ink is in the range of from 1% to 30% by mass, more preferably from 5% to 20% by mass, from the aspects of fixability and storage stability of the ink.

Preferably, solid contents dispersed in the ink have a maximum frequency particle diameter in the range of from 20 to 1,000 nm, more preferably from 20 to 150 nm, based on the number of solid contents, from the aspects of discharge stability and image quality (e.g., image density) of the ink. The solid contents include particles (grains) of the resin particles and the pigment. The particle diameter of the solid contents can be measured with a particle size distribution analyzer (NANOTRAC WAVE-UT151 available from MicrotracBEL Corp.).

Additive

The ink may further include a surfactant, a defoamer, a preservative, a fungicide, a corrosion inhibitor, and/or a pH adjuster, if necessary.

Surfactant

Usable surfactants include silicone-based surfactants, fluorine-based surfactants, ampholytic surfactants, nonionic surfactants, and anionic surfactants.

The silicone-based surfactant has no specific limit and can be suitably selected to suit to a particular application.

Of these, preferred are silicone-based surfactants which are not decomposed even in a high pH environment. Specific examples thereof include, but are not limited to, side-chain-modified polydimethylsiloxane, both-end-modified polydimethylsiloxane, one-end-modified polydimethylsiloxane, and side-chain-both-end-modified polydimethylsiloxane. In particular, those having a polyoxyethylene group and/or a polyoxyethylene polyoxypropylene group as the modifying group are preferable because they demonstrate good characteristics as an aqueous surfactant. Specific examples of the silicone-based surfactants further include polyether-modified silicone-based surfactants, such as a dimethyl siloxane compound having a polyalkylene oxide structure unit on a side chain thereof which is bonded to Si.

Specific preferred examples of the fluorine-based surfactants include, but are not limited to, perfluoroalkyl sulfonic acid compounds, perfluoroalkyl carboxylic acid compounds, perfluoroalkyl phosphate compounds, perfluoroalkyl ethylene oxide adducts, and polyoxyalkylene ether polymer compounds having a perfluoroalkyl ether group on its side chain. These compounds have weak foaming property. Specific examples of the perfluoroalkyl sulfonic acid compounds include, but are not limited to, perfluoroalkyl sulfonic acid and perfluoroalkyl sulfonate. Specific examples of the perfluoroalkyl carboxylic acid compounds include, but are not limited to, perfluoroalkyl carboxylic acid and perfluoroalkyl carboxylate. Specific examples of the polyoxyalkylene ether polymer compounds having a perfluoroalkyl ether group on a side chain include, but are not limited to, a sulfate of a polyoxyalkylene ether polymer having a perfluoroalkyl ether group on its side chain, and a salt of a polyoxyalkylene ether polymer having a perfluoroalkyl ether group on its side chain. Specific examples of the counter ions for these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the ampholytic surfactants include, but are not limited to, laurylaminopropionate, lauryl dimethyl betaine, stearyl dimethyl betaine, and lauryl hydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block copolymers, sorbitan fatty acid esters, polyoxyethylene sorbitan fatty acid esters, and ethylene oxide adducts of acetylene alcohol.

Specific examples of the anionic surfactants include, but are not limited to, acetate, dodecylbenzene sulfonate, and laurate of polyoxyethylene alkyl ether, and polyoxyethylene alkyl ether sulfate.

Each of these compounds can be used alone or in combination with others.

Specific examples of the silicone-based surfactants include, but are not limited to, side-chain-modified polydimethylsiloxane, both-end-modified polydimethylsiloxane, one-end-modified polydimethylsiloxane, and side-chain-and-both-end-modified polydimethylsiloxane. More specifically, polyether-modified silicone-based surfactants having polyoxyethylene group and/or polyoxyethylene polyoxypropylene group as the modifying groups are preferable since they exhibit good properties as an aqueous surfactant. These surfactants are available either synthetically or commercially. Commercial products are readily available from BYK Japan KK, Shin-Etsu Chemical Co., Ltd., Dow Corning Toray Co., Ltd., Nihon Emulsion Co., Ltd., and Kyoeisha Chemical Co., Ltd.

Specific examples of the polyether-modified silicone-based surfactants include, but are not limited to, a compound represented by the following formula (S-1) that is a dimethylpolysiloxane having a polyalkylene oxide structure on its side chain bonded to Si atom.

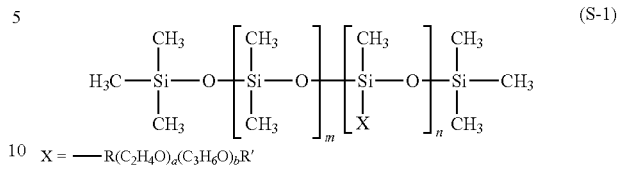

$X = ——R(C_2H_4O)_a(C_3H_6O)_bR'$

In the formula (S-1), each of m, n, a, and b independently represents an integer, R represents an alkylene group, and R' represents an alkyl group. Specific examples of commercially-available polyether-modified silicone-based surfactants include, but are not limited to: KF-618, KF-642, and KF-643 (available from Shin-Etsu Chemical Co., Ltd.); EMALEX-SS-5602 and SS-1906EX (available from Nihon Emulsion Co., Ltd.); FZ-2105, FZ-2118, FZ-2154, FZ-2161, FZ-2162, FZ-2163, and FZ-2164 (available from Dow Corning Toray Co., Ltd); BYK-33 and BYK-387 (available from BYK Japan KK); and TSF4440, TSF4452, and TSF4453 (available from Momentive Performance Materials Inc.).

Preferably, the fluorine-based surfactant is a compound having 2 to 16 fluorine-substituted carbon atoms, more preferably a compound having 4 to 16 fluorine-substituted carbon atoms.

Specific examples of the fluorine-based surfactants include, but are not limited to, perfluoroalkyl phosphate compounds, perfluoroalkyl ethylene oxide adducts, and polyoxyalkylene ether polymer compounds having a perfluoroalkyl ether group on its side chain.

Among these fluorine-based surfactants, polyoxyalkylene ether polymer compounds having a perfluoroalkyl ether group on its side chain is preferable since foaming property thereof is small. More specifically, compounds represented by the following formula (F-1) and (F-2) are preferable.

$$CF_3CF_2(CF_2CF_2)_m—CH_2CH_2O(CH_2CH_2O)_nH \quad (F\text{-}1)$$

In the formula (F-1), m is preferably an integer of from 0 to 10, and n is preferably an integer of from 0 to 40, to have water-solubility.

Formula (F-2)  $CnF_{2n+1}—CH_2CH(OH)CH_2—O—(CH_2CH_2O)_a—Y$ In the formula (F-2), Y represents H, $C_mF_{2m+1}$ (where m represents an integer of from 1 to 6), $CH_2CH(OH)CH_2\text{-}C_mF_{2m+1}$ (where m represents an integer of from 4 to 6), or $C_pF_{2p+1}$ (where p represents an integer of from 1 to 19); n represents an integer of from 1 to 6; and a represents an integer of from 4 to 14.

The fluorine-based surfactants are available either synthetically or commercially. Specific examples of commercially-available fluorine-based surfactants include, but are not limited to: SURFLON S-111, S-112, S-113, S-121, S-131, S-132, S-141, and S-145 (available from Asahi Glass Co., Ltd.); Fluorad™ FC-93, FC-95, FC-98, FC-129, FC-135, FC-170C, FC-430, and FC-431 (available from Sumitomo 3M Limited); MEGAFACE F-470, F-1405, and F-474 (available from DIC Corporation); Zonyl® TBS, FSP, FSA, FSN-100, FSN, FSO-100, FSO, FS-300, UR, CAPSTONE FS-30, FS-31, FS-3100, FS-34, and FS-35 (available from The Chemours Company); FT-110, FT-250, FT-251, FT-400S, FT-150, and FT-400SW (available from NEOS COMPANY LIMITED); PolyFox PF-136A, PF-156A, PF-151N, PF-154, and PF-159 (available from OMNOVA Solutions Inc.); and UNIDYNE™ DSN-403N (available from Daikin Industries, Ltd.). Among these, in terms of improvements in printing quality, in particular color developing property, paper permeability, paper wettability, and uniform dying property, FS-3100, FS-34, and FS-300 (available from The Chemours Company), FT-110, FT-250, FT-251, FT-400S, FT-150, and FT-400SW (available from NEOS COMPANY LIMITED), PolyFox PF-151N (available from OMNOVA Solutions Inc.), and UNIDYNE™ DSN-403N (available from Daikin Industries, Ltd.) are particularly preferred.

Preferably, the content rate of the surfactant in the ink is in the range of from 0.001% to 5% by mass, more preferably from 0.05% to 5% by mass, from the aspects of wettability and image quality.

Defoamer

Specific examples of the defoamer include, but are not limited to, silicone defoamers, polyether defoamers, and fatty acid ester defoamers. Each of these compounds can be used alone or in combination with others. Among these defoamers, silicone defoamers are preferable since they have excellent defoaming ability.

Preservative and Fungicide

Specific examples of the preservative and fungicide include, but are not limited to, 1,2-benzisothiazoline-3-one.

Corrosion Inhibitor

Specific examples of the corrosion inhibitor include, but are not limited to, acid sulphite and sodium thiosulfate.

pH Adjuster

The pH adjuster has no particular limit so long as it is capable of adjusting the pH to 7 or higher. Specific examples of such a pH adjuster include, but are not limited to, amines such as diethanolamine and triethanolamine.

The property of the ink is not particularly limited and can be suitably selected to suit to a particular application.

Preferably, the ink has a viscosity at 25° C. in the range of from 5 to 30 mPa·s, more preferably from 5 to 25 mPa·s, to improve print density and text quality and obtain good dischargeability. The viscosity can be measured at 25° C. by a rotatory viscometer (RE-80L available from Toki Sangyo Co., Ltd.) equipped with a standard cone rotor (1° 34'×R24), while setting the sample liquid amount to 1.2 mL, the number of rotations to 50 rotations per minute (rpm), and the measuring time to 3 minutes.

Preferably, the ink has a surface tension of 35 mN/m or less, more preferably 32 mN/m or less, at 25° C., so that the ink is suitably levelized on a recording medium and the drying time of the ink is shortened.

Preferably, the ink has a pH in the range of from 7 to 12, more preferably from 8 to 11, in terms of prevention of corrosion of metal materials contacting the ink.

Ink Storage Container

An ink storage container according to an embodiment of the present invention includes: a container for storing an ink; and the ink according to an embodiment of the present invention stored in the container. Furthermore, the ink storage container may optionally include other members.

The container is not limited in shape, structure, size, and material. For example, the container may be in the form of a main tank or an ink cartridge having an ink accommodating unit made of an aluminum laminate film or a resin film.

Recording Medium

The recording medium is not particularly limited. For example, plain paper, gloss paper, special paper, and cloth are usable. Also, non-permeating substrates are preferably used.

The non-permeating substrate has a surface with a low level of moisture permeability and absorptivity. Examples of such a non-permeating substrate include a material having a number of hollow spaces inside but not open to the exterior. To be more quantitative, the non-permeating substrate refers to a substrate that absorbs water in an amount of 10 mL/m$^2$ or less between the start of contact and 30 msec$^{1/2}$ after the start of contact, measured according to the Bristow method.

Specific examples of the non-permeating substrate include, but are not limited to, plastic films such as vinyl chloride resin films, polyethylene terephthalate (PET) films, polypropylene films, polyethylene films, and polycarbonate films.

The recording medium is not limited to articles used as typical recording media. It is suitable to use building materials such as wall paper, floor material, and tile, cloth for apparel such as T-shirts, textile, and leather as the recording medium. In addition, the configuration of the paths through which the recording medium is transferred can be adjusted to accommodate ceramics, glass, metal, etc.

Printed Matter

The printed matter according to an embodiment of the present invention includes a recording medium and an image formed on the recording medium with the ink according to an embodiment of the present invention.

The printed matter may be produced by an inkjet recording device and an inkjet recording method.

Recording Device and Recording Method

The ink according to an embodiment of the present invention can be suitably applied to various printing devices employing an inkjet printing method, such as printers, facsimile machines, photocopiers, multifunction peripherals (serving as a printer, a facsimile machine, and a photocopier), and three-dimensional objects manufacturing devices (e.g., 3D printers, additive manufacturing devices).

In the present disclosure, the recording device and the recording method respectively represent a device capable of discharging ink and various processing fluids to a recording medium and a method for recording an image on the recording medium using the device. The recording medium refers to an article to which the ink or the various processing fluids can be attached at least temporarily.

The recording device according to an embodiment of the present invention includes an ink discharger including a discharge head configured to discharge the ink according to an embodiment of the present invention onto a recording medium to record information or an image on the recording medium.

The recording method according to an embodiment of the present invention includes the processes of applying a stimulus to the ink according to an embodiment of the present invention through an ink discharger, and discharging the ink from the ink discharger to record information or an image on a recording medium.

The recording device may further optionally include devices relating to feeding, conveying, and ejecting of the recording medium and other devices referred to as a pretreatment device or an aftertreatment device, in addition to the ink discharger.

The recording device may further optionally include a heater for use in the heating process and a drier for use in the drying process. Examples of the heater and the drier include devices to heat and dry the print surface and the reverse surface of a recording medium. Specific examples of the heater and the drier include, but are not limited to, a fan heater and an infra-red heater. The heating process and the drying process may be performed either before, during, or after printing.

In addition, the recording device and the recording method are not limited to those producing merely meaningful visible images such as texts and figures with the ink. For example, the recording device and the recording method can produce patterns like geometric design and 3D images.

The recording device includes both a serial type device in which the discharge head is caused to move and a line type device in which the discharge head is not moved. The discharge head includes both a circulation type discharge head that circulates a liquid in multiple independent liquid chambers and a non-circulation type discharge head.

The ink may be used in combination with the circulation type discharge head with an intention to achieve both high image quality and high productivity. In this case, the ink is circulated within a circulation tank under negative pressures and moisture evaporates from the ink, thus changing the ink to a more hydrophobic composition. As the balance between hydrophilicity and hydrophobicity is thus changed, dispersion stability of the pigment in the ink is lowered and irregular discharge is likely to occur in a continuous printing.

On the other hand, the ink according to an embodiment of the present invention can provide excellent storage stability and discharge stability and the ability of forming high-quality images without causing beading, even when used in combination with the circulation type discharge head. The circulation type discharge head generally provides high quality image without causing irregular discharge with a less amount of maintenance ink. Therefore, the combination of the ink according to an embodiment of the present invention with the circulation type discharge head provides high quality image without causing beading or irregular discharge at a high productivity. The circulation type discharge head is described in detail later.

Furthermore, in addition to the desktop type, the recording device includes a device capable of printing images on a large recording medium with AO size and a continuous printer capable of using continuous paper reeled up in a roll form as recording media.

Figure 2:
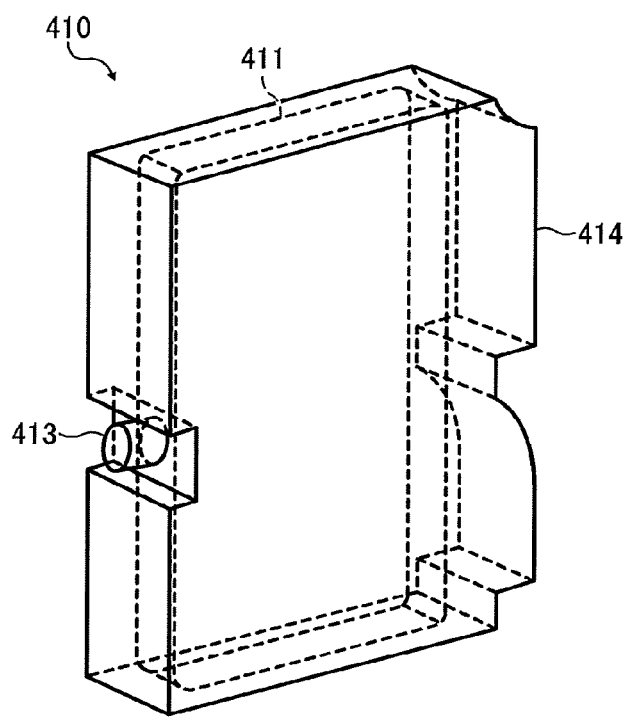
FIG. 2 is a schematic perspective view of an ink storage container according to an embodiment of the present invention.

As one example of the recording device according to an embodiment of the present invention, an image forming apparatus 400 is described in detail below with reference to FIGS. 1 and 2. FIG. 1 is a perspective view of the image forming apparatus 400. FIG. 2 is a perspective view of a main tank for use in the image forming apparatus 400. The image forming apparatus 400 is a serial type image forming apparatus. A mechanical unit 420 is disposed in a housing 401 of the image forming apparatus 400. Main tanks 410k, 410c, 410m, and 410y for respective color of black (K), cyan (C), magenta (M), and yellow (Y) (hereinafter collectively referred to as "main tank 410") each include an ink container 411. Each ink container 411 is made of a packaging member such as an aluminum laminate film. The ink container 411 is accommodated in a container casing 414 made of plastic. As a result, the main tank 410 is used as an ink cartridge of each color.

A cartridge holder 409 is disposed on the rear side of the opening when a cover 401c is opened. The main tank 410 is detachably attachable to the cartridge holder 409. As a result, each ink discharging outlet 413 of the main tank 410 communicates with a discharge head 434 for each color via a supplying tube 436 for each color so that the ink can be discharged from the discharge head 434 to a recording medium.

Recording Device and Recording Method Using Circulation Type Discharge Head

A recording device using a circulation type discharge head refers to the above-described recording device in that the ink discharger includes: an ink discharge head including a nozzle to discharge the ink, a plurality of individual liquid chambers in communication with the nozzle, a flow-in channel to let the ink flow into the individual liquid chambers, and a flow-out channel to let the ink flow out of the individual liquid chambers; and a negative pressure generator to generate a negative pressure to let the ink flow out of the individual liquid chambers.

A recording method using a circulation type discharge head refers to the above-described recording method in that the process of discharging the ink further includes the processes of letting the ink flow into an individual liquid chamber from a flow-in channel, generating a negative pressure, and letting the ink flow out of the individual liquid chamber into a flow-out channel by action of the negative pressure.

Figure 3:
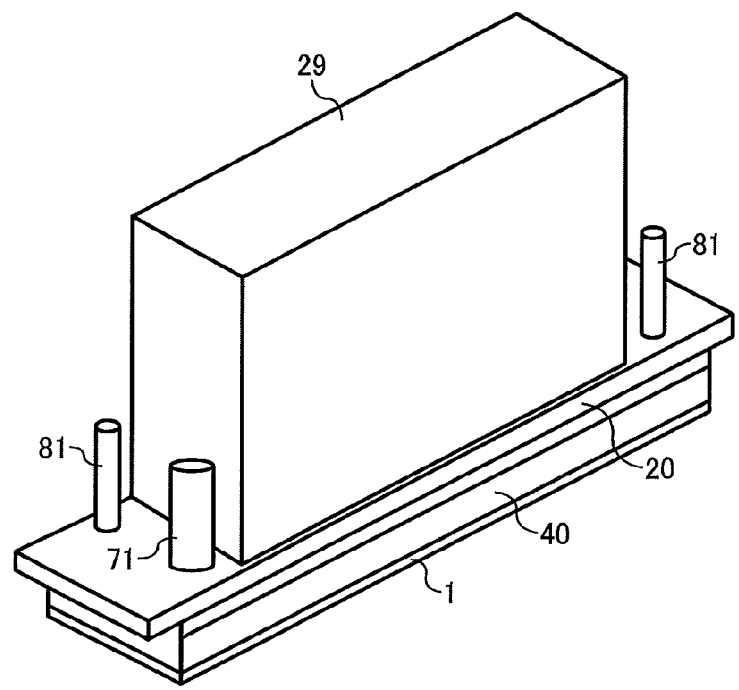
FIG. 3 is a schematic perspective view of an outline of a circulation type liquid discharge head.
Figure 4:
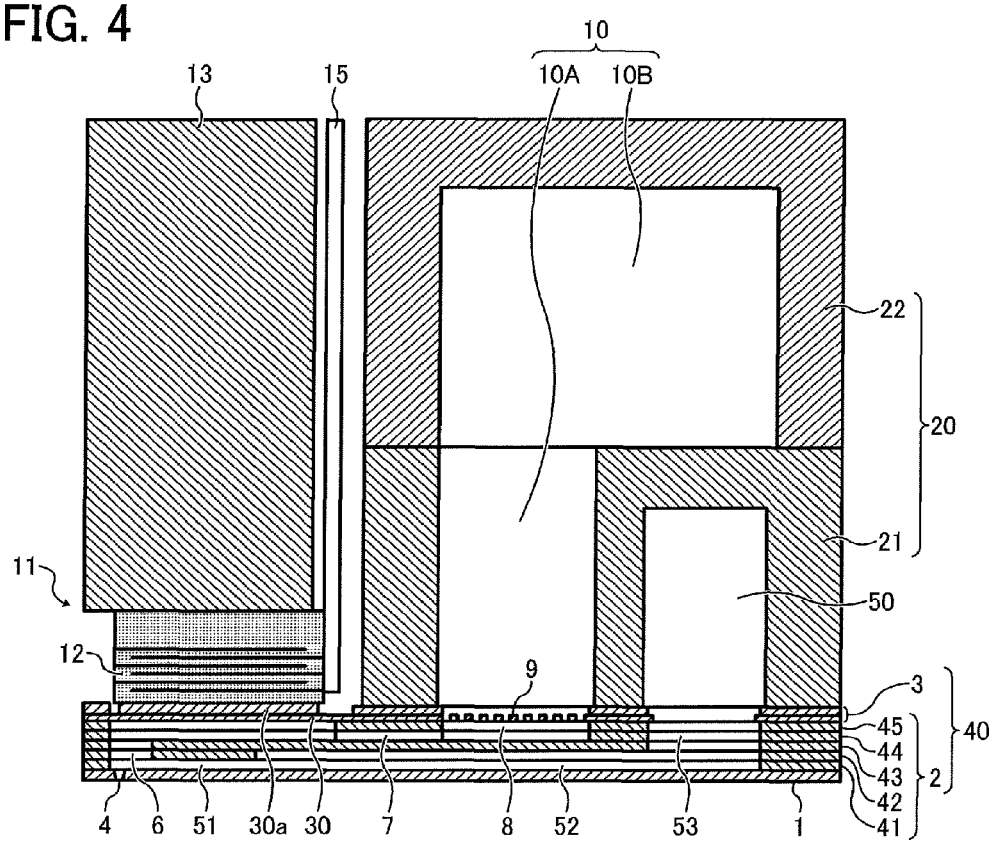
FIG. 4 is a cross-sectional view of the head illustrated in FIG. 3 in a direction perpendicular to the nozzle array direction.
Figure 5:
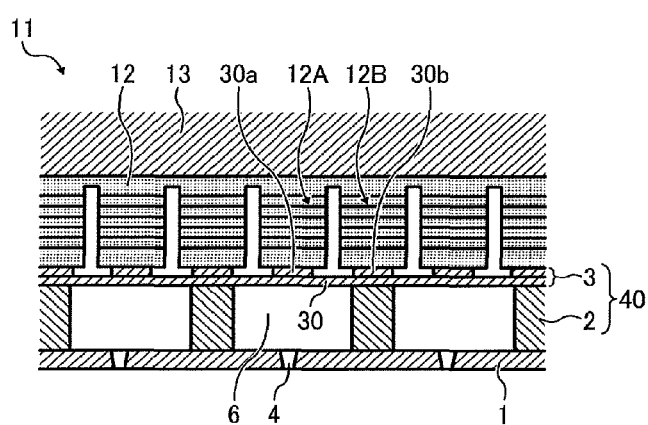
FIG. 5 is a cross-sectional view of the head illustrated in FIG. 3 in a direction parallel to the nozzle array direction.
Figure 6:
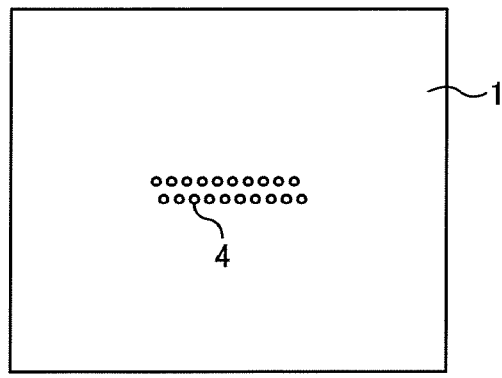
FIG. 6 is a plan view of a nozzle plate of the head illustrated in FIG. 3.

One example of the circulation type discharge head is described below with reference to FIGS. 3 to 8. FIG. 3 is an outline perspective view of the circulation type discharge head (hereinafter simply "head"). FIG. 4 is a cross-sectional view of the head in a direction perpendicular to the nozzle array direction. FIG. 5 is a cross-sectional view of the head in a direction parallel to the nozzle array direction. FIG. 6 is a plan view of a nozzle plate of the head. FIGS. 7A to 7F are plan views of members constituting a channel substrate of the head. FIGS. 8A and 8B are plan views of members constituting a common liquid chamber substrate of the head.

In the head, a nozzle plate 1, a channel plate 2, and a diaphragm 3 as a wall member are attached to and laminated on each other. The head further includes a piezoelectric actuator 11 that displaces the diaphragm 3, a common liquid chamber substrate 20, and a cover 29.

The nozzle plate 1 includes multiple nozzles 4 that discharge liquid.

The channel plate 2 forms an individual liquid chamber 6 in communication with the nozzle 4, a fluid resistance part 7 in communication with the individual liquid chamber 6, and a liquid introduction part 8 in communication with the fluid resistance part 7. The channel plate 2 is formed of multiple plate-like members 41 to 45 attached to each other in a lamination manner on the nozzle plate 1. The plate-like members 41 to 45 and the diaphragm 3 are attached to and laminated on each other to form a channel substrate 40.

The diaphragm 3 includes a filter part 9 serving as an opening in communication with a common liquid chamber 10 formed of the liquid introduction part 8 and the common liquid chamber substrate 20.

The flow-in channel refers to a channel connected with the individual liquid chamber 6 that is disposed upstream of a position where liquid flows into the individual liquid chamber 6. The flow-in channel corresponds to the liquid introduction part 8 and the common liquid chamber 10.

The diaphragm 3 is a wall member forming the wall of the individual liquid chamber 6 of the channel plate 2. This diaphragm 3 employs a two-layered structure (but not limited thereto) including, from the channel plate 2 side, the first layer forming a thin portion and the second layer forming a thick portion. A vibration area 30 that is deformable is formed at the portion of the first layer corresponding to the individual liquid chamber 6.

The nozzle plate 1 includes multiple nozzles 4 arranged in a zigzag manner, as illustrated in FIG. 6.

Figure 7A:
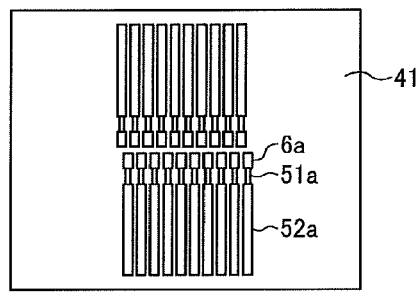
FIGS. 7A to 7F are plan views of members constituting a channel substrate of the head illustrated in FIG. 3.
Figure 8A:
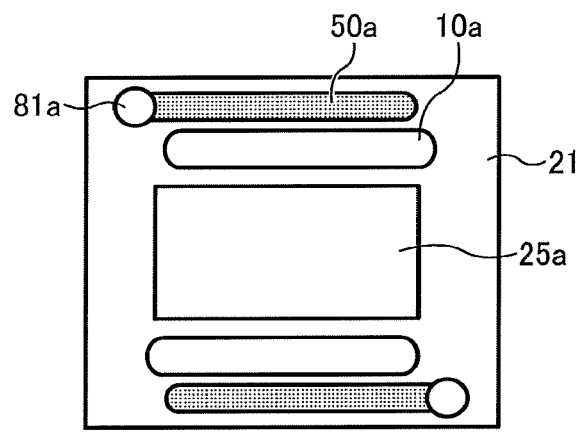
FIGS. 8A and 8B are plan views of members constituting a common liquid chamber substrate of the head illustrated in FIG. 3.
Figure 8B:
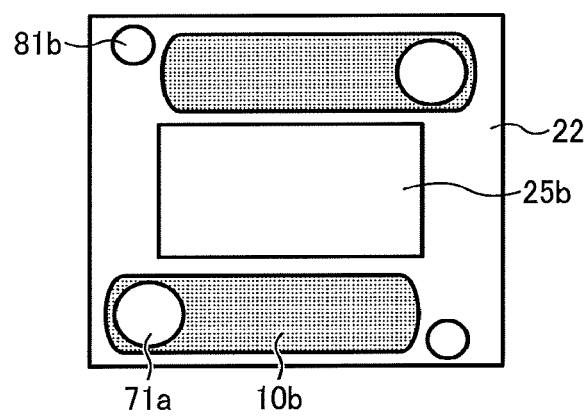

As illustrated in FIG. 7A, the plate-like member 41 constituting the channel plate 2 includes through grooves (meaning through holes having a groove form) 6a each constituting the individual liquid chamber 6, through grooves 51*a* each constituting a fluid resistance part 51, and through grooves 52*a* each constituting a circulation channel 52.

Figure 7B:
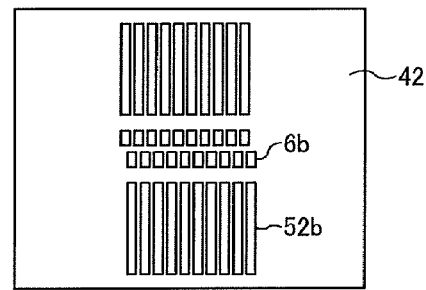

As illustrated in FIG. 7B, the plate-like member 42 includes through grooves 6*b* each constituting the individual liquid chamber 6 and through grooves 52*b* each constituting the circulation channel 52.

Figure 7C:
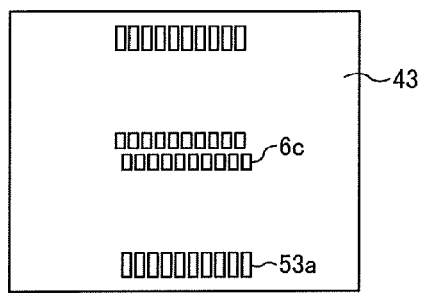

As illustrated in FIG. 7C, the plate-like member 43 includes through grooves 6*c* each constituting the individual liquid chamber 6 and through grooves 53*a* each constituting a circulation channel 53. The through grooves 53*a* have a longitudinal direction coincident with the nozzle array direction.

Figure 7D:
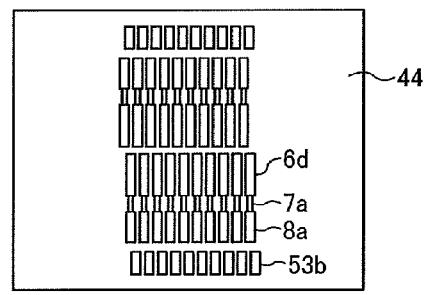
Figure 7E:
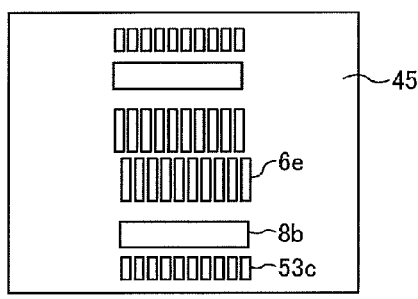

As illustrated in FIG. 7D, the plate-like member 44 includes through grooves 6*d* each constituting the individual liquid chamber 6, through grooves 7*a* each constituting the fluid resistance part 7, through grooves 8*a* each constituting the liquid introduction part 8, and through grooves 53*b* each constituting the circulation channel 53. The through grooves 53*b* have a longitudinal direction coincident with the nozzle array direction. As illustrated in FIG. 7E, the plate-like member 45 includes through grooves 6*e* each constituting the individual liquid chamber 6, a through groove 8*b* (serving as a liquid chamber disposed downstream of the filter) constituting the liquid introduction part 8, and through grooves 53*c* each constituting the circulation channel 53. Both the through groove 8*b* and the through grooves 53*c* have a longitudinal direction coincident with the nozzle array direction.

Figure 7F:
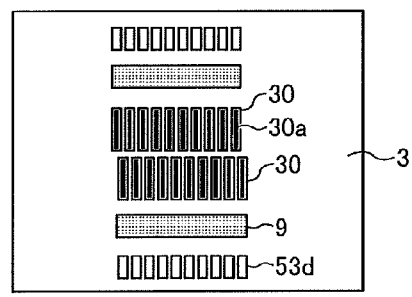

As illustrated in FIG. 7F, the diaphragm 3 includes the vibration areas 30, the filter part 9, and through grooves 53*d* each constituting the circulation channel 53. The through grooves 53*d* have a longitudinal direction coincident with the nozzle array direction.

As a consequence, a complicate channel can be formed by a simple configuration in which multiple plate-like members are attached to each other in a lamination manner.

According to the configuration described above, in the channel substrate 40 formed of the channel plate 2 and the diaphragm 3, the fluid resistance part 51, the circulation channel 52, and the circulation channel 53 are formed along the plane direction of the channel plate 2. The fluid resistance part 51 is in communication with the individual liquid chamber 6. The circulation channel 53 is formed in the thickness direction of the channel substrate 40 in communication with the circulation channel 52. The circulation channel 53 is in communication with a circulation common liquid chamber 50 to be described later.

The flow-out channel refers to a channel connected with the individual liquid chamber 6 that is disposed downstream of a position where liquid flows into the individual liquid chamber 6. The flow-out channel corresponds to the circulation channels 52 and 53 and the circulation common liquid chamber 50.

The common liquid chamber substrate 20 forms the common liquid chamber 10, to which liquid is supplied from a supply-circulation mechanism 494 (to be described later), and the circulation common liquid chamber 50.

The common liquid chamber substrate 20 includes a first common liquid chamber substrate 21 and a second common liquid chamber substrate 22. As illustrated in FIG. 8A, the first common liquid chamber substrate 21 includes a through hole 25*a* for the piezoelectric actuator 11, a through groove 10*a* serving as a downstream common liquid chamber 10A disposed on the downstream side, and a groove 50*a* (having the bottom) serving as the circulation common liquid chamber 50.

As illustrated in FIG. 8B, the second common liquid chamber substrate 22 includes a through hole 25*b* for the piezoelectric actuator 11 and a groove 10*b* serving as an upstream common liquid chamber 10B disposed on the upstream side.

The second common liquid chamber substrate 22 further includes a through hole 71*a* to communicate one end of the common liquid chamber 10 in the nozzle array direction with a supply port 71 illustrated in FIG. 3.

Similarly, the first common liquid chamber substrate 21 and the second common liquid chamber substrate 22 include a through hole 81*a* and a through hole 81*b*, respectively, to communicate the other end (the opposite end on the side of the through hole 71*a*) of the circulation common liquid chamber 50 with a circulation port 81.

In FIGS. 8A and 8B, the grooves having the bottom are hatched. (The same applies to other drawings.)

The common liquid chamber substrate 20 includes the first common liquid chamber substrate 21 and the second common liquid chamber substrate 22, as described above. The first common liquid chamber substrate 21 is attached to the channel substrate 40 on the diaphragm 3 side and the second common liquid chamber substrate 22 is attached to and laminated on the first common liquid chamber substrate 21.

The first common liquid chamber substrate 21 forms the downstream common liquid chamber 10A, constituting a part of the common liquid chamber 10 in communication with the liquid introduction part 8, and the circulation common liquid chamber 50 in communication with the circulation channel 53. The second common liquid chamber substrate 22 forms the upstream common liquid chamber 10B constituting the rest of the common liquid chamber 10.

The downstream common liquid chamber 10A constituting a part of the common liquid chamber 10 and the circulation common liquid chamber 50 are disposed next to each other in a direction perpendicular to the nozzle array direction. The circulation common liquid chamber 50 is disposed at the position projected in the common liquid chamber 10.

By this disposition, the dimension of the circulation common liquid chamber 50 is free of the restriction ascribable to the dimensions required for the individual liquid chamber 6, the fluid resistance part 7, and the liquid introduction part 8 formed in the channel substrate 40.

Since the circulation common liquid chamber 50 and a part of the common liquid chamber 10 are disposed side by side and the circulation common liquid chamber 50 is located at the position projected in the common liquid chamber 10, the width of the head in a direction perpendicular to the nozzle array direction is restricted, thereby preventing size increase of the head. The common liquid chamber substrate 20 forms the common liquid chamber 10, to which liquid is supplied from a head tank or a liquid cartridge, and the circulation common liquid chamber 50.

On the other side of the diaphragm 3 opposite to the individual liquid chamber 6, the piezoelectric actuator 11 is disposed. The piezoelectric actuator 11 includes an electromechanical transducer element that deforms the vibration area 30 of the diaphragm 3.

As illustrated in FIG. 5, this piezoelectric actuator 11 includes a piezoelectric member 12 attached to a base material 13. The piezoelectric member 12 is grooved by half cut dicing and a particular number of piezoelectric elements (piezoelectric pillar) 12A and 12B having a pillar-like form are formed in the piezoelectric member 12 spaced a predetermined distance therebetween in a pectinate manner.

In the present embodiment, the piezoelectric element 12A is driven by application of a drive waveform while the piezoelectric element 12B is not driven but simply used as a pillar. Alternatively, all of the piezoelectric elements 12A and 12B can be used as the piezoelectric element to be driven by application of drive waveforms.

The piezoelectric element 12A is attached to a convex portion 30a that is a thick portion having an island-like form formed on the vibration area 30 of the diaphragm 3. The piezoelectric element 12B is attached to a convex portion 30b that is a thick portion of the diaphragm 3.

The piezoelectric member 12 includes piezoelectric layers and internal electrodes alternately laminated on each other. Each internal electrode is pulled out to the end surface to form an external electrode. The external electrode is connected with a flexible wiring member 15.

In the circulation type discharge head having such a configuration, the piezoelectric element 12A is contracted by lowering the voltage applied to the piezoelectric element 12A in comparison with a reference voltage. As a result, the vibration area 30 of the diaphragm 3 is lowered and the individual liquid chamber 6 is inflated, thereby letting the liquid flow into the individual liquid chamber 6.

The piezoelectric element 12A is thereafter expanded in the lamination direction by raising the voltage applied to the piezoelectric element 12A. Thus, the vibration area 30 of the diaphragm 3 is deformed toward the nozzle 4 and the individual liquid chamber 6 is contracted. As a result, the liquid in the individual liquid chamber 6 is pressurized and discharged from the nozzle 4.

The voltage applied to the piezoelectric element 12A is thereafter returned to the reference voltage to restore the vibration area 30 of the diaphragm 3 to the initial position. As a result, the individual liquid chamber 6 is inflated to generate a negative pressure, and the liquid is supplied from the common liquid chamber 10 to the individual liquid chamber 6. After the vibration of the meniscus surface of the nozzle 4 has attenuated and stabilized, the operation transits to next discharge procedure.

The drive method of the head is not limited to the above-described method (pull-push discharging). The way of discharging changes depending on how a drive waveform is applied. For example, pull discharging or push discharging is possible. In addition, in the embodiments described above, a lamination type piezoelectric element is used as a pressure generator to cause pressure fluctuation to the individual liquid chamber 6, but the pressure generator is not limited thereto. It is possible to use a piezoelectric element having a thin-film like form. Furthermore, it is possible to use a heat element disposed in the individual liquid chamber 6 to form bubbles by heat, thereby generating pressure fluctuation, or to utilize electrostatic force to cause pressure fluctuation.

Next, one example of a liquid circulation system using the circulation type discharge head is described with reference to FIG. 9.

Figure 9:
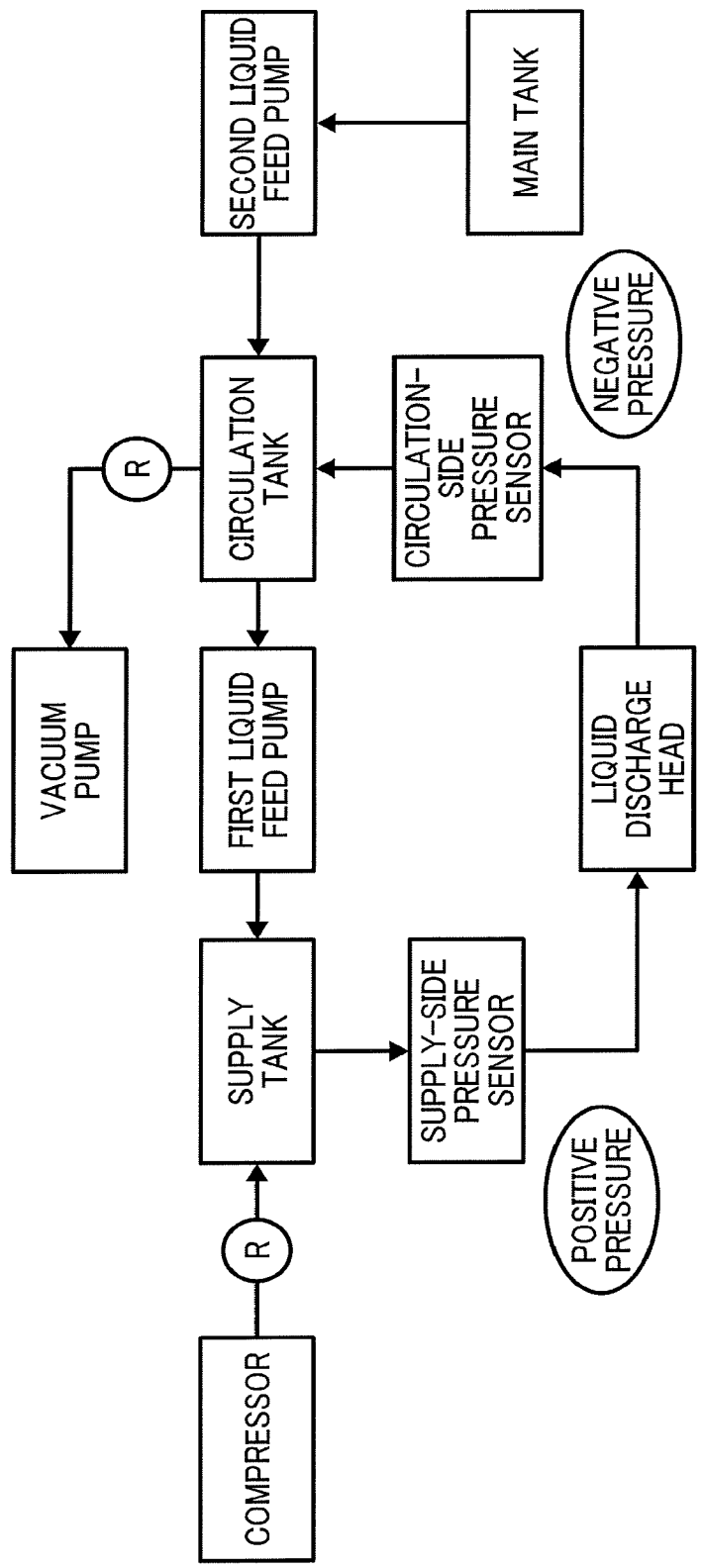
FIG. 9 is a block diagram of a liquid circulation system according to an embodiment of the present invention.

FIG. 9 is a block diagram of a liquid circulation system.

As illustrated in FIG. 9, the liquid circulation system includes a main tank, a liquid discharge head, a supply tank, a circulation tank, a compressor, a vacuum pump, a first liquid feed pump, a second liquid feed pump, regulators (R), a supply-side pressure sensor, and a circulation-side pressure sensor. The vacuum pump serves as the negative pressure generator. The supply-side pressure sensor is disposed between the supply tank and the liquid discharge head and connected with the supply channel side of the liquid discharge head connected with the supply port 71 (FIG. 3). The circulation-side pressure sensor is disposed between the liquid discharge head and the circulation tank and connected with the circulation channel side of the liquid discharging head connected with the circulation port 81 (FIG. 3).

One end of the circulation tank is connected with the supply tank via the first liquid feed pump and the other end thereof is connected with the main tank via the second liquid feed pump. The liquid is flown from the supply tank into the liquid discharge head via the supply port 71, and discharged to the circulation tank via the circulation port 81. The liquid is further fed from the circulation tank to the supply tank by the first liquid feed pump, thus circulating the liquid.

The compressor is connected with the supply tank to control such that the supply-side pressure sensor detects a predetermined positive pressure. The vacuum pump is connected with the circulation tank to control such that the circulation-side pressure sensor detects a predetermined negative pressure. Accordingly, while the liquid is circulated through the liquid discharge head, the negative pressure of the meniscus can be kept constant.

In addition, as liquid droplets are discharged from the nozzle of the liquid discharge head, the amount of the liquid in the supply tank and the circulation tank decreases.

Therefore, it is preferable to properly supply liquid from the main tank to the circulation tank with the second liquid feed pump. The timing of the liquid supply from the main tank to the circulation tank can be controlled according to the detection result of the liquid surface sensor disposed in the circulation tank. For example, liquid can be supplied when the liquid surface of the ink in the circulation tank is lowered in comparison with the predetermined height.

Next, the circulation of the liquid in the circulation type discharge head is described below. As illustrated in FIG. 3, the supply port 71 communicating with the common liquid chamber 10 and the circulation port 81 communicating with the circulation common liquid chamber 50 are formed on one end of the common liquid chamber substrate 20. The supply port 71 and the circulation port 81 are respectively connected with the supply tank and the circulation tank (FIG. 9) for storing liquid via tubes. The liquid stored in the supply tank is supplied to the individual liquid chamber 6 via the supply port 71, the common liquid chamber 10, the liquid introduction part 8, and the fluid resistance part 7.

Moreover, while the liquid in the individual liquid chamber 6 is discharged from the nozzle 4 due to drive of the piezoelectric member 12, a part or the entire of the liquid remaining in the individual liquid chamber 6 without being discharged is circulated from the fluid resistance part 51, the circulation channels 52 and 53, the circulation common liquid chamber 50, and the circulation port 81 to the circulation tank.

The liquid can be circulated during not only the operation of the liquid discharge head but also waiting time. Circulating the liquid during waiting time is preferable because the liquid in the individual liquid chamber is constantly refreshed and agglomeration or sedimentation of the component contained in the liquid can be suppressed. The vacuum pump is connected with the circulation tank for keeping the negative pressure of the meniscus constant. However, in a case in which the liquid contains a highly volatile component, a problem arises that such a component gradually volatilizes to change the composition of the liquid with time. In particular, when the liquid is a water-based pigment ink, the ink composition becomes more hydrophobic as moisture evaporates from the ink. As the balance between hydrophilicity and hydrophobicity is thus changed, dispersion stability of the pigment in the ink is lowered and irregular discharge is likely to occur in a continuous printing. On the other hand, since the ink according to an embodiment of the present invention can maintain good dispersion stability even in a highly hydrophobic state, the ink in combination with the circulation type discharge head provide high quality images without irregular discharge or defective image at a high productivity.

Figure 10:
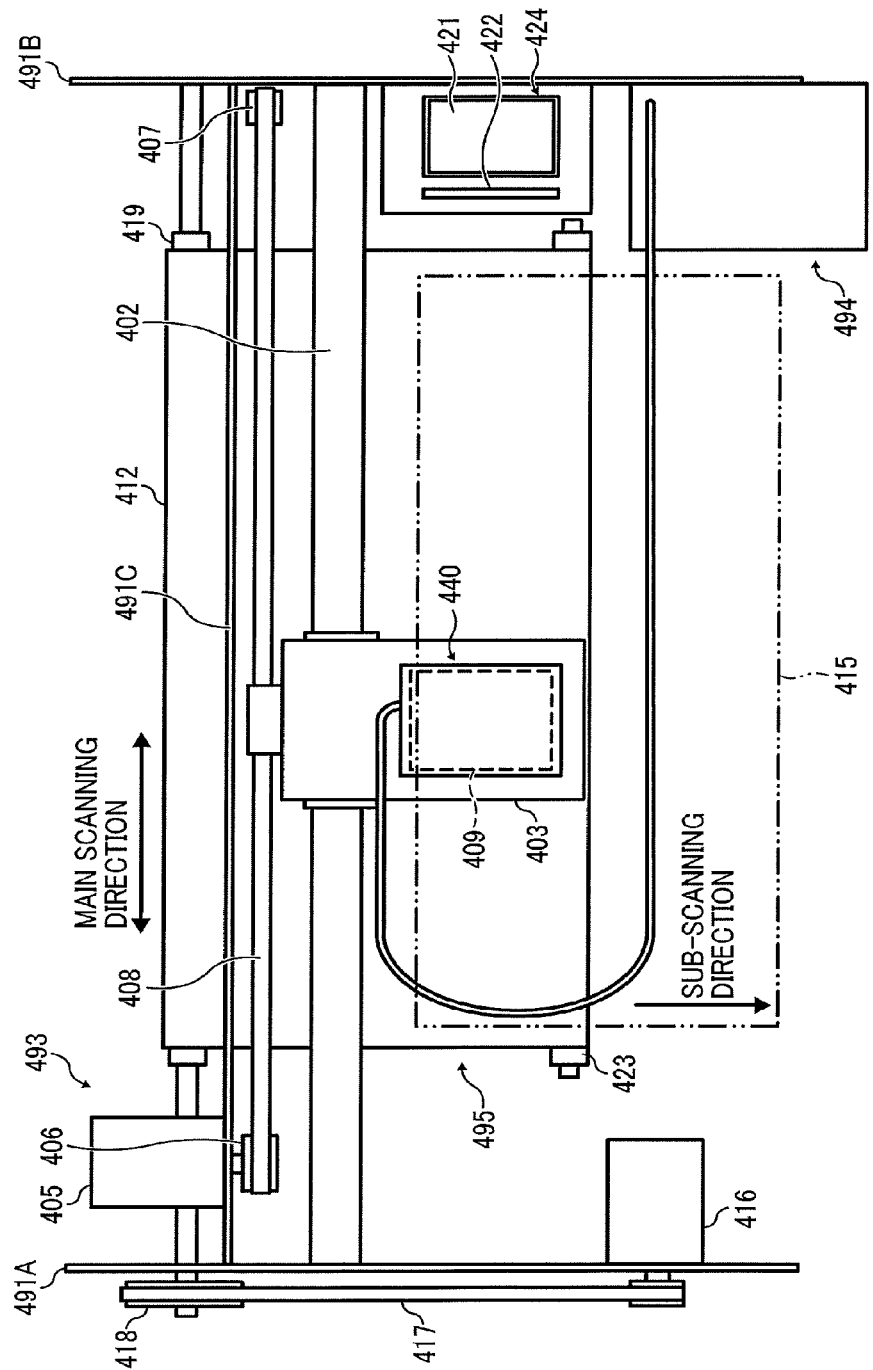
FIG. 10 is a plan view of a major part of a liquid discharge device including a circulation type liquid discharge head.
Figure 11:
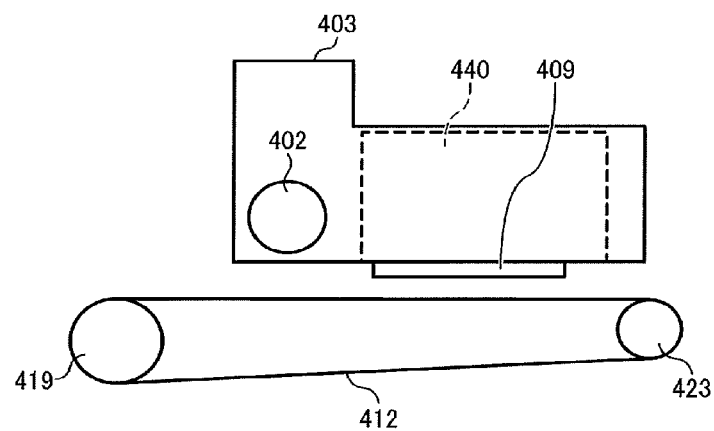
FIG. 11 is a side view of a major part of the liquid discharge device illustrated in FIG. 10.

One example of a liquid discharge device using the circulation type discharge head is described below with reference to FIGS. 10 and 11. FIG. 10 is a plan view of a major part of the liquid discharge device. FIG. 11 is a side view of a major part of the liquid discharge device.

This device is a serial type device in which a main scanning moving mechanism 493 reciprocates a carriage 403 in the main scanning direction. The main scanning moving mechanism 493 includes a guide member 402, a main scanning motor 405, and a timing belt 408. The guide member 402 is bridged between the right and left side plates 491A and 491B to moveably hold the carriage 403. The main scanning motor 405 reciprocates the carriage 403 in the main scanning direction via the timing belt 408 bridged between a drive pulley 406 and a driven pulley 407.

The carriage 403 carries a liquid discharge unit 440 carrying a liquid discharge head 404. The liquid discharge head 404 of the liquid discharge unit 440 discharges color liquids of, for example, yellow (Y), cyan (C), magenta (M), and black (K). The liquid discharge head 404 has nozzle arrays each including multiple nozzles arranged in the sub-scanning direction that is perpendicular to the main scanning direction. The liquid discharge head 404 is mounted on the liquid discharge unit 440 with its discharging surface facing downward.

A liquid stored outside the liquid discharge head 404 is supplied to and circulated in the liquid discharge head 404 by a supply-circulation mechanism 494. The supply-circulation mechanism 494 includes a supply tank, a circulation tank, a compressor, a vacuum pump, a liquid feed pump, and a regulator (R). A supply-side pressure sensor is disposed between the supply tank and the liquid discharge head and connected with the supply channel side of the liquid discharge head connected with the supply port 71. A circulation-side pressure sensor is disposed between the liquid discharge head and the circulation tank and connected with the circulation channel side of the liquid discharging head connected with the circulation port 81.

This device further includes a conveyance mechanism 495 to convey a recording medium 415. The conveyance mechanism 495 includes a conveyance belt 412 serving as a conveyer and a sub-scanning motor 416 to drive the conveyance belt 412.

The conveyance belt 412 adsorbs the recording medium 415 and conveys it to the position facing the liquid discharge head 404. The conveyance belt 412 is in the form of an endless belt stretched between a conveyance roller 419 and a tension roller 423. The conveyance belt 412 adsorbs the recording medium 415 by electrostatic adsorption or suction.

The conveyance belt 412 moves around in the sub-scanning direction as the conveyance roller 419 is rotationally driven by the sub-scanning motor 416 via a timing belt 417 and a timing pulley 418.

On one side of the carriage 403 in the main scanning direction, a maintenance mechanism 424 for maintaining the liquid discharge head 404 is disposed lateral to the conveyance belt 412.

The maintenance mechanism 424 includes a capping member 421 to cap a nozzle surface (surface on which the nozzle is formed) of the liquid discharge head 404 and a wiping member 422 to wipe off the nozzle surface.

The main scanning moving mechanism 493, the supply-circulation mechanism 494, the maintenance mechanism 424, and the conveyance mechanism 495 are installed onto a housing including the side plates 491A and 491B and a back plate 491C.

In this device having such a configuration, the recording medium 415 is fed and adsorbed onto the conveyance belt 412 and conveyed along the sub-scanning direction by the rotational movement of the conveyance belt 412.

By driving the liquid discharge head 404 in response to an image signal while moving the carriage 403 in the main-scanning direction, the liquid is discharged onto the recording medium 415 not in motion to record an image.

Since the circulation type discharge head is provided in this device, high quality images can be stably formed.

Figure 12:
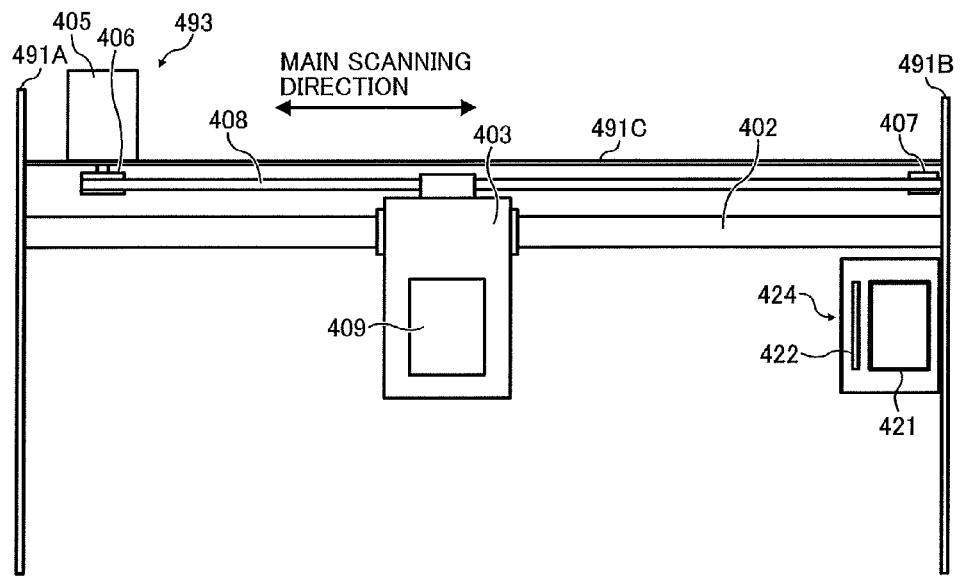
FIG. 12 is a plan view of a major part of a liquid discharge unit according to an embodiment of the present invention.

Next, a liquid discharge unit according to an embodiment of the present invention is described with reference to FIG. 12 as another example. FIG. 12 is a plan view of a major part of the liquid discharge unit.

This liquid discharge head is constituted of the housing portion including the side plates 491A and 491B and the back plate 491C, the main scanning moving mechanism 493, the carriage 403, and the liquid discharge head 404, which are the same members constituting the above-described liquid discharge device.

Optionally, the liquid discharging unit can be constituted in such a manner that at least one of the maintenance mechanism 424 and the supply-circulation mechanism 494 is further attached to, for example, the side plate 491B.

In the present disclosure, the liquid discharge head refers to a functional part configured to discharge or eject liquid from a nozzle.

As energy sources for discharging the liquid, piezoelectric actuators (e.g., laminated piezoelectric elements, thin-film piezoelectric elements), thermal actuators using electrothermal conversion elements such as heat elements, and electrostatic actuators formed of a vibration plate and a counter electrode may be used.

The recording device according to an embodiment of the present invention may further optionally include a pretreatment device and/or an aftertreatment device, in addition to the ink discharger.

As an example, the pretreatment device and the aftertreatment device may be provided as a liquid discharger including a liquid container containing the pretreatment or aftertreatment liquid and a liquid discharge head to discharge the pretreatment or aftertreatment liquid by inkjet recording method, having a similar configuration to the liquid discharger for each of the black (K), cyan (C), magenta (M), and yellow (Y) inks.

As another example, the pretreatment device and the aftertreatment device may be provided as a device employing a method other than inkjet recording method, such as blade coating, roll coating, or spray coating.

The ink may be applied not only to inkjet recording method but also to other methods in various fields. Specific examples of such methods other than inkjet recording method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited. For example, the ink can be used for printed matter, a paint, a coating material, and foundation.

The ink can be used to form two-dimensional texts and images and furthermore three-dimensional objects.

The apparatus for manufacturing three-dimensional objects can be any known device with no particular limit. For example, the apparatus includes an ink container, a supplying device, and a discharging device, a drier, etc. The three-dimensional object includes an object produced by re-applying ink over and over. In addition, the three-dimensional object includes a processed product produced by processing a structure including a substrate (such as a recording medium) and an ink applied thereon. The processed product is fabricated by, for example, heating drawing or punching a structure or printed matter having a sheet-like form, film-like form, etc. The processed product is suitable for what is formed after surface-decorating. Examples thereof are gauges or operation panels of vehicles, office machines, electric and electronic machines, cameras, etc.

EXAMPLES

The present invention is described in detail with reference to the Examples but not limited to the following Examples. "Parts" represents parts by mass and "percent" represents percent by mass unless otherwise specified in the following description.

Example 1

Preparation of Pigment Dispersion

A 10% by mass aqueous solution of a polymeric dispersant having a polyoxyethylene structure (BYKJET-9151 available from BYK Japan KK) was prepared. This aqueous solution in an amount of 100 g was stir-mixed for 12 hours with 50 g of a quinacridone pigment containing a sulfonic acid derivative synergist of quinacridone (FASTOGEN Super Magenta JM2120 available from DTC Corporation, mixed crystal of C.I. Pigment Red 202 and Pigment Violet 19) and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 30 g of 3-butoxy-N,N-dimethylpropanamide (having a solubility parameter of 9.03), 1 g of Zonyl® FS-300 (available from Du Pont, a fluorine-based surfactant having a solid content concentration of 40% by mass), and 39 g of ion-exchange water. The obtained mixture was heated in a sealed state at 80° C. for 6 hours. The mixture was thereafter filtered with a membrane filter having a pore diameter of 0.8 μm. Thus, an ink of Example 1 was prepared.

Example 2

Preparation of Pigment Dispersion

A 10% by mass aqueous solution of a polymeric dispersant having a polyoxyethylene structure (BYKJET-9152 available from BYK Japan KK) was prepared. This aqueous solution in an amount of 100 g was stir-mixed for 12 hours with 50 g of a quinacridone pigment containing a sulfonic acid derivative synergist of quinacridone (FASTOGEN Super Magenta RFS available from DTC Corporation, mixed crystal of C.I. Pigment Red 122 and Pigment Violet 19) and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 40 g of N,N-dimethyl-3-propanamide (having a solubility parameter of 9.08), 1 g of Zonyl® FS-300 (available from Du Pont, a fluorine-based surfactant having a solid content concentration of 40% by mass), and 29 g of ion-exchange water. The obtained mixture was heated in a sealed state at 70° C. for 12 hours. The mixture was thereafter filtered with a membrane filter having a pore diameter of 0.8 μm. Thus, an ink of Example 2 was prepared.

Example 3

Synthesis of Synergist

A 100-mL four-neck flask was charged with 40 g of 98% sulfuric acid, and 5 g of 2,9-dimethylquinacridone was put in the flask little by little. The mixture in the flask was heated to 90° C. and stirred for 5 hours to cause a reaction, and thereafter returned to room temperature. The reaction liquid was gradually mixed in 400 g of ice water being stirred. As a result, a red-purple precipitate was formed. The liquid was filtered with a glass filter and washed with 200 g of ion-exchange water for 3 times, followed by heat drying at 60° C. under reduced pressures. Thus, 2.3 g of 2,9-dimethylquinacridone was obtained.

Synthesis of Polymeric Dispersant

A monomer solution was prepared by dissolving 10 g of acrylic acid, 20 g of BLEMMER® PME-1000 (available from NOF CORPORATION, reactive monomer having a polyoxyethylene structure), 5 g of benzyl methacrylate, and 5 g of butyl methacrylate in 150 mL of dry methyl ethyl ketone. Ten percent (10%) of the monomer solution was heated to 75° C. under argon gas flow. In the rest (90%) of the monomer solution, 0.62 g of 2,2'-azoiso(butylonitrile) was dissolved. This solution was dropped in the 10% of the monomer solution, having been heated to 75° C., over a period of 1.5 hours. The obtained mixture was stirred at 75° C. for 6 hours. After being cooled to room temperature, the resultant reaction solution was poured in hexane. The supernatant solution was discarded and the precipitated copolymer was obtained. The precipitated copolymer was dissolved in tetrahydrofuran, followed by evaporation, and dried under reduced pressures. Thus, 39.2 g of a polymeric dispersant A (having a weight average molecular weight (Mw) of 16,500 and a number average molecular weight (Mn) of 7,200) was prepared.

Preparation of Pigment Dispersion

A 10% by mass aqueous solution of the polymeric dispersant A was prepared. This aqueous solution in an amount of 100 g was stir-mixed for 12 hours with 47 g of a quinacridone pigment (FASTOGEN Super Magenta RTS available from DIC Corporation, C.I. Pigment Red 122), 3 g of a sulfonic acid derivative of 2,9-dimethylquinacridone, and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 50 g of 3-ethoxy-N,N-dimethylpropanamide (having a solubility parameter of 9.13), 1 g of Zonyl® FS-300 (available from Du Pont, a fluorine-based surfactant having a solid content concentration of 40% by mass), and 19 g of ion-exchange water. The obtained mixture was heated in a sealed state at 60° C. for 24 hours. The mixture was thereafter filtered with a membrane filter having a pore diameter of 0.8 μm. Thus, an ink of Example 3 was prepared.

Example 4

Synthesis of Synergist

A 100-mL four-neck flask was charged with 40 g of 98% sulfuric acid, and 5 g of 3,10-dichloroquinacridone was put in the flask little by little. The mixture in the flask was heated to 90° C. and stirred for 5 hours to cause a reaction, and thereafter returned to room temperature. The reaction liquid was gradually mixed in 400 g of ice water being stirred. As a result, a red-purple precipitate was formed. The liquid was filtered with a glass filter and washed with 200 g of ion-exchange water for 3 times, followed by heat drying at 60° C. under reduced pressures. Thus, 2.2 g of 3,10-dichloroquinacridone was obtained. Preparation of Pigment Dispersion A 10% by mass aqueous solution of a polymeric dispersant (Dispex® Ultra PA4550 available from BASF) was prepared. This aqueous solution in an amount of 100 g was stir-mixed for 12 hours with 47 g of a quinacridone pigment (FASTOGEN Super Magenta Red 209228-6736 available from DIC Corporation, C.I. Pigment Red 209), 3 g of a sulfonic acid derivative of 3,10-dichloroquinacridone, and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 60 g of 3-methoxy-N,N-dimethylpropanamide (having a solubility parameter of 9.19), 1 g of Zonyl® FS-300 (available from Du Pont, a fluorine-based surfactant having a solid content concentration of 40% by mass), and 9 g of ion-exchange water. The obtained mixture was heated in a sealed state at 50° C. for 48 hours. The mixture was thereafter filtered with a membrane filter having a pore diameter of 0.8 μm. Thus, an ink of Example 4 was prepared.

Example 5

Synthesis of Synergist

A 100-mL four-neck flask was charged with 40 g of 98% sulfuric acid, and 5 g of 2,9-dichloroquinacridone was put in the flask little by little. The mixture in the flask was heated to 90° C. and stirred for 5 hours to cause a reaction, and thereafter returned to room temperature. The reaction liquid was gradually mixed in 400 g of ice water being stirred. As a result, a red-purple precipitate was formed. The liquid was filtered with a glass filter and washed with 200 g of ion-exchange water for 3 times, followed by heat drying at 60° C. under reduced pressures. Thus, 2.1 g of 2,9-dichloroquinacridone was obtained.

Preparation of Pigment Dispersion

A 10% by mass aqueous solution of a polymeric dispersant (Dispex® Ultra PA4560 available from BASF) was prepared. This aqueous solution in an amount of 100 g was stir-mixed for 12 hours with 47 g of a quinacridone pigment (Cinquasia® Magenta D4500J available from BASF, mixed crystal of C.I. Pigment Red 202 and Pigment Violet 19), 3 g of a sulfonic acid derivative of 2,9-dichloroquinacridone, and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 40 g of 3-ethyl-3-oxetanemethanol (having a solubility parameter of 11.31), 1 g of Zonyl® FS-300 (available from Du Pont, a fluorine-based surfactant having a solid content concentration of 40% by mass), and 29 g of ion-exchange water. The obtained mixture was heated in a sealed state at 40° C. for 72 hours. The mixture was thereafter filtered with a membrane filter having a pore diameter of 0.8 μm. Thus, an ink of Example 5 was prepared.

Example 6

Synthesis of Synergist

A 100-mL four-neck flask was charged with 40 g of 98% sulfuric acid, and 5 g of unsubstituted quinacridone was put in the flask little by little. The mixture in the flask was heated to 90° C. and stirred for 5 hours to cause a reaction, and thereafter returned to room temperature. The reaction liquid was gradually mixed in 400 g of ice water being stirred. As a result, a red-purple precipitate was formed. The liquid was filtered with a glass filter and washed with 200 g of ion-exchange water for 3 times, followed by heat drying at 60° C. under reduced pressures. Thus, 2.0 g of unsubstituted quinacridone was obtained.

Preparation of Pigment Dispersion

A 10% by mass aqueous solution of a polymeric dispersant (PX 4585 available from BASF) was prepared. This aqueous solution in an amount of 100 g was stir-mixed for 12 hours with 47 g of a quinacridone pigment (INK JET MAGENTA E7B VP 3958 available from Clariant, mixed crystal of C.I. Pigment Red 122 and Pigment Violet 19), 3 g of a sulfonic acid derivative of unsubstituted quinacridone, and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Preparation of Ink

The above-prepared pigment dispersion in an amount of 30 g was stir-mixed for 1 hour with 40 g of 3-methyl-3-oxetanemethanol (having a solubility parameter of 11.79), 1 g of Zonyl® FS-300 (available from Du Pont, a fluorine-based surfactant having a solid content concentration of 40% by mass), and 29 g of ion-exchange water. The obtained mixture was heated in a sealed state at 30° C. for 120 hours. The mixture was thereafter filtered with a membrane filter having a pore diameter of 0.8 μm. Thus, an ink of Example 6 was prepared.

Example 7

An ink of Example 7 was prepared in the same manner as the ink of Example 5 except for replacing the 40 g of 3-ethyl-3-oxetanemethanol (having a solubility parameter of 11.31) with 30 g of 3-ethyl-3-oxetanemethanol (having a solubility parameter of 11.31) and 10 g of 1,2-pentanediol (having a solubility parameter of 12.21).

Example 8

An ink of Example 8 was prepared in the same manner as the ink of Example 5 except for replacing the 40 g of 3-ethyl-3-oxetanemethanol (having a solubility parameter of 11.31) with 10 g of 3-ethyl-3-oxetanemethanol (having a solubility parameter of 11.31) and 30 g of 1,2-hexanediol (having a solubility parameter of 11.80).

Example 9

An ink of Example 9 was prepared in the same manner as the ink of Example 5 except for replacing the 40 g of 3-ethyl-3-oxetanemethanol (having a solubility parameter of 11.31) with 35 g of 3-ethyl-3-oxetanemethanol (having a solubility parameter of 11.31) and 5 g of 1,7-heptanediol (having a solubility parameter of 11.61).

Comparative Example 1

An ink of Comparative Example 1 was prepared in the same manner as the ink of Example 1 except for changing the ink preparation process as follows.

Preparation of Ink

The pigment dispersion prepared in Example 1 in an amount of 30 g was stir-mixed for 1 hour with 25 g of 3-butoxy-N,N-dimethylpropanamide (having a solubility parameter of 9.03), 1 g of Zonyl® FS-300 (available from Du Pont, a fluorine-based surfactant having a solid content concentration of 40% by mass), and 44 g of ion-exchange water. The obtained mixture was heated in a sealed state at 80° C. for 6 hours. The mixture was thereafter filtered with a membrane filter having a pore diameter of 0.8 μm. Thus, an ink of Comparative Example 1 was prepared.

Comparative Example 2

An ink of Comparative Example 2 was prepared in the same manner as the ink of Example 4 except for changing the ink preparation process as follows.

Preparation of Ink

The pigment dispersion prepared in Example 4 in an amount of 30 g was stir-mixed for 1 hour with 65 g of 3-methoxy-N,N-dimethylpropanamide (having a solubility parameter of 9.19), 1 g of Zonyl® FS-300 (available from Du Pont, a fluorine-based surfactant having a solid content concentration of 40% by mass), and 4 g of ion-exchange water. The obtained mixture was heated in a sealed state at 50° C. for 48 hours. The mixture was thereafter filtered with a membrane filter having a pore diameter of 0.8 μm. Thus, an ink of Comparative Example 2 was prepared.

Comparative Example 3

An ink of Comparative Example 3 was prepared in the same manner as the ink of Example 3 except for replacing the pigment dispersion with another pigment dispersion prepared as follows.

Preparation of Pigment Dispersion

A 10% by mass aqueous solution of a polymeric dispersant (BYKJET-9170 available from BYK Japan KK) was prepared. This aqueous solution in an amount of 100 g was stir-mixed for 12 hours with 50 g of a quinacridone pigment (FASTOGEN Super Magenta RTS available from DIC Corporation, C.I. Pigment Red 122) and 150 g of ion-exchange water. The obtained mixture was subject to circulation dispersion at a peripheral speed of 10 m/s for 1 hour using a disk type bead mill (KDL type available from Shinmaru Enterprises Corporation, filled with zirconia ball media having a diameter of 0.1 mm), thereafter filtered with a membrane filter having a pore diameter of 1.2 μm, and further mixed with water for adjustment. Thus, a pigment dispersion (having a solid content concentration of 15% by mass) was prepared.

Comparative Example 4

An ink of Comparative Example 4 was prepared in the same manner as the ink of Example 3 except for replacing the polymeric dispersant with another polymeric dispersant prepared as follows.

Synthesis of Polymeric Dispersant

A monomer solution was prepared by dissolving 10 g of acrylic acid, 10 g of styrene, 10 g of benzyl methacrylate, and 10 g of butyl methacrylate in 150 mL of dry methyl ethyl ketone. Ten percent (10%) of the monomer solution was heated to 75° C. under argon gas flow. In the rest (90%) of the monomer solution, 0.82 g of 2,2'-azoiso(butylonitrile) was dissolved. This solution was dropped in the 10% of the monomer solution, having been heated to 75° C., over a period of 1.5 hours. The obtained mixture was stirred at 75° C. for 6 hours. After being cooled to room temperature, the resultant reaction solution was poured in hexane. The supernatant solution was discarded and the precipitated copolymer was obtained. The precipitated copolymer was dissolved in tetrahydrofuran, followed by evaporation, and dried under reduced pressures. Thus, 38.8 g of a polymeric dispersant B (having a weight average molecular weight (Mw) of 15,000 and a number average molecular weight (Mn) of 6,300) was prepared.

Comparative Example 5

An ink of Comparative Example 5 was prepared in the same manner as the ink of Example 3 except for eliminating the heating process.

Comparative Example 6

An ink of Comparative Example 6 was prepared in the same manner as the ink of Example 1 except for changing the ink preparation process as follows.
Preparation of Ink The pigment dispersion prepared in Example 1 in an amount of 30 g was stir-mixed for 1 hour with 25 g of 3-hexyloxy-N,N-dimethylpropanamide (having a solubility parameter of 8.96), 1 g of Zonyl® FS-300 (available from Du Pont, a fluorine-based surfactant having a solid content concentration of 40% by mass), and 44 g of ion-exchange water. The obtained mixture was heated in a sealed state at 80° C. for 6 hours. The mixture was thereafter filtered with a membrane filter having a pore diameter of 0.8 μm. Thus, an ink of Comparative Example 6 was prepared.

Comparative Example 7

An ink of Comparative Example 7 was prepared in the same manner as the ink of Example 1 except for changing the ink preparation process as follows.
Preparation of Ink The pigment dispersion prepared in Example 1 in an amount of 30 g was stir-mixed for 1 hour with 25 g of cyclopentanol (having a solubility parameter of 11.87), 1 g of Zonyl® FS-300 (available from Du Pont, a fluorine-based surfactant having a solid content concentration of 40% by mass), and 44 g of ion-exchange water. The obtained mixture was heated in a sealed state at 80° C. for 6 hours. The mixture was thereafter filtered with a membrane filter having a pore diameter of 0.8 μm. Thus, an ink of Comparative Example 7 was prepared.

The compositions of the inks of Examples 1 to 9 and Comparative Examples 1 to 7 and the blending ratios of pigment dispersion, organic solvent, surfactant, and ion-exchange water in the inks are shown in Tables 1 to 3.

The inks of Examples 1 to 9 and Comparative Examples 1 to 7 were evaluated in terms of storage stability, discharge stability, and beading.

In the evaluation of storage stability, viscosity change rate, D50 change rate, and D90 change rate were measured. Details of the evaluation procedures are described below. The evaluation results are shown in Table 4.
Evaluation Methods
Storage Stability Each of the above-prepared ink in an amount of 20 g was weighed in a glass container (LABORAN Screw Tube No. 6, 30 mL, available from AS ONE Corporation) and sealed therein with a lid and a piece of PTFE sealing tape (fluorine-based seal tape available from AS ONE Corporation) attached to the boundary between the glass container and the lid. The glass container was left to stand still for 24 hours at room temperature while suppressing the ink from volatilizing. The ink was thereafter subjected to the measurements of viscosity and particle diameter to obtain characteristic values before storage. Similarly, each of the above-prepared ink in an amount of 20 g was weighed in a glass container (LABORAN Screw Tube No. 6, 30 mL, available from AS ONE Corporation) and sealed therein with a lid and a piece of PTFE sealing tape (fluorine-based seal tape available from AS ONE Corporation) attached to the boundary between the glass container and the lid. The glass container was stored still in a compact environmental tester (Bench-Top Type Temperature Chamber SU-221 available from ESPEC CORP.) at 80° C. for 4 weeks while suppressing the ink from volatilizing with time during the storage. After the 4-week storage was completed, the glass container was taken out of the compact environmental tester and left to stand still for 3 hours at room temperature, so that the sample temperature returned to room temperature. After the seal tape was detached and the lid was opened, the ink was taken out of the glass container and subjected to the measurements of viscosity and particle diameter to obtain characteristic values after storage. The change rate of each characteristic value (i.e., viscosity, particle diameter) before and after storage was determined from the following formula. The amount of volatilization of ink during the storage was determined by measuring the mass of the sample (ink) before and after the 4-week storage. As a result, it was confirmed that the amount of mass decrease before and after the storage was 0.05 g or less for each ink. This means that significant ink volatilization did not occur.

Change Rate (%)=((Characteristic Value after Storage)−(Characteristic Value before Storage))/(Characteristic Value before Storage)×100

The viscosity was measured with a viscometer (TVE-25L available from Tobi Sangyo Co., Ltd.) using a standard cone rotor (1°34'×R24). Each sample (ink) in an amount of 1.1 ml was used for the measurement. The sample temperature was kept at 25° C. by a circulation thermostatic chamber during the measurement. The number of rotation of the rotor at the time of viscosity measuring was set such that the measured value was within 50% to 90% of the upper limit of the measurable value. The other measurement conditions are as follows.

Measurement mode: Auto-Stop Mode
Measurement range: M
Measurement unit: mPa·s
Measurement stop time: 120 seconds
Preheat function: ON
Preheat time: 120 seconds The particle diameter was measured with a particle size distribution analyzer (NANOTRAC WAVE available from Nikkiso Co., Ltd.) in the following manner. First, a cell was sufficiently washed with clean pure water produced by a pure water equipment (PURELITE PRO-0100 available from ORGANO CORPORATION) and thereafter filled with clean pure water. After visually confirmed that no bubble had entered into the cell and neither fluctuation nor movement had occurred in the cell, a zero set measurement was performed. The pure water was thereafter taken out of the cell. Each ink was diluted with pure water so that the pigment concentration becomes 0.05%, thus preparing a sample solution. After the cell was washed with this sample solution for 3 times, the sample solution was filled in the cell. After visually confirmed that no bubble had entered into the cell and neither fluctuation nor movement had occurred in the cell, the sample solution was subjected to a measurement of particle diameter distribution to determine D50 (50% diameter) and D90 (90% diameter).

Zero set time: 60 seconds
Measurement time: 120 seconds
Number of times of measurement: 1
Transmissivity: Transmissive particle
Refractive index: 1.51
Shape: Non-sphere Density: 1.40
Refractive index of solvent: 1.333
Viscosity at high temperatures: 0.797 at 30° C.
Viscosity at low temperatures: 1.002 at 20° C.
Filter: Stand: Norm
Sensitivity: Standard Discharge Stability Each ink was set in an inkjet printer (IPSIO GX-e5500 available from Ricoh Co., Ltd.). The discharge head of this inkjet printer is not a circulation type discharge head. A print chart having a print area ratio of 5% was printed on 1,000 sheets by this printer. Immediately after the 1,000$^{th}$ printed sheet was output and after a lapse of 24 hours from the end of the printing, a solid image, a halftone image, and a nozzle check pattern were printed on 5 sheets of an industrial inkjet paper (SWORD iJET 4.3 Gloss available from Mitsubishi Paper Mills Limited). The printed images were visually observed to determine image uniformity and the presence or absence of nozzle-like voids to evaluate the degrees of irregular discharge or nozzle clogging. The printing operation was one pass printing performed under the condition "100% duty" with a recording density of 600×300 dpi. The evaluation criteria are as follows.

Evaluation Criteria

A: Neither irregular discharge nor nozzle clogging occurred.
B: Irregular discharge slightly occurred, but no nozzle clogging occurred.
C: Irregular discharge significantly occurred, and nozzle clogging occurred.

Beading

The solid image printed above for evaluating discharge stability was further visually observed to evaluate the degree of image density unevenness. Evaluation was conducted according to the following criteria.

Evaluation Criteria

A: No density unevenness was observed.
B: A slight degree of density unevenness was observed.
C: A significant degree of density unevenness was observed.

Discharging Stability with Circulation Type Discharge Head

Each ink was set in an inkjet printer (IPSIO GX-e5500 available from Ricoh Co., Ltd.) that had been modified to include the discharge head illustrated in FIGS. 3 to 11. A print chart having a print area ratio of 5% was printed on 1,000 sheets by this printer. Immediately after the 1,000$^{th}$ printed sheet was output and after a lapse of 48 hours from the end of the printing, a solid image, a halftone image, and a nozzle check pattern were printed on 5 sheets of an industrial inkjet paper (SWORD iJET 4.3 Gloss available from Mitsubishi Paper Mills Limited). The printed images were visually observed to determine image uniformity and the presence or absence of nozzle-like voids to evaluate the degrees of irregular discharge or nozzle clogging. The printing operation was one pass printing performed under the condition "100% duty" with a recording density of 600×300 dpi. The evaluation criteria are as follows. In this evaluation, the ink was circulated under negative pressures during not only the operation of the circulation type discharge head but also waiting time.

Evaluation Criteria

A: Neither irregular discharge nor nozzle clogging occurred.
B: Irregular discharge slightly occurred, but no nozzle clogging occurred.
C: Irregular discharge occurred, but no nozzle clogging occurred.
D: Irregular discharge significantly occurred, and nozzle clogging occurred.

It is clear from Table 4 that the inks of Examples 1 to 9 are superior to the inks of Comparative Examples 1 to 7 in terms of storage stability, discharge stability, and image quality. It is also clear that the inks of Examples 1 to 9 provide excellent discharge stability even when used in combination with the recording device equipped with the circulation type discharge head.

It is to be noted that Comparative Examples 3, 4, and 6 were not subjected to the evaluations of discharge stability, beading, and discharge stability with circulation type discharge head, because a change rate in storage stability was large.

TABLE 1

| | | | Example 1 | Example 2 | Example 3 |
|---|---|---|---|---|---|
| Ink Components | Pigment Dispersion | Polymeric Dispersant | BYKJET-9151 (Polyoxyethylene Structure) | BYKJET-9152 (Polyoxyethylene Structure) | Synthetic Polymeric Dispersant A (Polyoxyethylene Structure) |
| | | Quinacridone Pigment | C.I. PR 202/ C.I. PV 19 | C.I. PR 122/ C.I. PV 19 | C.I. PR 122 |
| | | Synergist | Sulfonic Acid Derivative of Quinacridone | Sulfonic Acid Derivative of Quinacridone | Synthetic Sulfonic Acid Derivative of 2,9-Dimethylquinacridone |
| | Organic Solvent | Type | 3-Butoxy-N,N-dimethylpropanamide | N,N-Dimethyl-3-propanamide | 3-Ethoxy-N,N-dimethylpropanamide |
| | | Solubility Parameter | 9.03 | 9.08 | 9.13 |
| | | Surfactant | Zonyl ® FS-300 | Zonyl ® FS-300 | Zonyl ® FS-300 |
| Ink Composition (g) | | Pigment Dispersion | 30 | 30 | 30 |
| | | Organic Solvent | 30 | 40 | 50 |
| | | Surfactant | 1 | 1 | 1 |
| | | Ion-exchange Water | 39 | 29 | 19 |
| | | Total | 100 | 100 | 100 |
| Ink Heating Treatment Condition | | | 80° C., 6 hours | 70° C., 12 hours | 60° C., 24 hours |

TABLE 1-continued

|  |  |  | Example 4 | Example 5 | Example 6 |
|---|---|---|---|---|---|
| Ink Components | Pigment Dispersion | Polymeric Dispersant | Dispex ® Ultra PA 4550 | Dispex ® Ultra PA 4560 | Dispex ® Ultra PX 4585 |
|  |  | Quinacridone Pigment | C.I. PR 209 | C.I. PR 202/ C.I. PV 19 | C.I. PR 122/ C.I. PV 19 |
|  |  | Synergist | Synthetic Sulfonic Acid Derivative of 3,10-Dichloroquinacridone | Synthetic Sulfonic Acid Derivative of 2,9-Dichloroquinacridone | Synthetic Sulfonic Acid Derivative of Unsubstituted Quinacridone |
|  | Organic Solvent | Type | 3-Methoxy-N,N-dimethylpropanamide | 3-Ethyl-3-oxetanemethanol | 3-Methyl-3-oxetanemethanol |
|  |  | Solubility Parameter | 9.19 | 11.31 | 11.79 |
|  | Surfactant |  | Zonyl ® FS-300 | Zonyl ® FS-300 | Zonyl ® FS-300 |
| Ink Composition (g) | Pigment Dispersion |  | 30 | 30 | 30 |
|  | Organic Solvent |  | 60 | 40 | 40 |
|  | Surfactant |  | 1 | 1 | 1 |
|  | Ion-exchange Water |  | 9 | 29 | 29 |
|  | Total |  | 100 | 100 | 100 |
| Ink Heating Treatment Condition |  |  | 50° C., 48 hours | 40° C., 72 hours | 30° C., 120 hours |

TABLE 2

|  |  |  | Example 7 | Example 8 | Example 9 |
|---|---|---|---|---|---|
| Ink Components | Pigment Dispersion | Polymeric Dispersant | Dispex ® Ultra PA 4560 | Dispex ® Ultra PA 4560 | Dispex ® Ultra PA 4560 |
|  |  | Quinacridone Pigment | C.I. PR 202/ C.I. PV 19 | C.I. PR 202/ C.I. PV 19 | C.I. PR 202/ C.I. PV 19 |
|  |  | Synergist | Synthetic Sulfonic Acid Derivative of 2,9-Dichloroquinacridone | Synthetic Sulfonic Acid Derivative of 2,9-Dichloroquinacridone | Synthetic Sulfonic Acid Derivative of 2,9-Dichloroquinacridone |
|  | Organic Solvent | With SP of 9.00-11.80 (SP) | 3-Ethyl-3-oxetanemethanol (11.31) | 3-Ethyl-3-oxetanemethanol (11.31) 1,2-Hexanediol (11.80) | 3-Ethyl-3-oxetanemethanol (11.31) 1,7-Heptanediol (11.61) |
|  |  | Others (SP) | 1,2-Pentanediol (12.21) |  |  |
|  | Surfactant |  | Zonyl ® FS-300 | Zonyl ® FS-300 | Zonyl ® FS-300 |
| Ink Composition (g) | Pigment Dispersion |  | 30 | 30 | 30 |
|  | Organic Solvent with SP of 9.00-11.80 |  | 30 | 40 | 40 |
|  | C5-C7 Alkanediol |  | 10 | (30) | (5) |
|  | Surfactant |  | 1 | 1 | 1 |
|  | Ion-exchange Water |  | 29 | 29 | 29 |
|  | Total |  | 100 | 100 | 100 |
| Ink Heating Treatment Condition |  |  | 40° C., 72 hours | 40° C., 72 hours | 40° C., 72 hours |

TABLE 3

|  |  |  | Comparative Example 1 | Comparative Example 2 | Comparative Example 3 | Comparative Example 4 |
|---|---|---|---|---|---|---|
| Ink Components | Pigment Dispersion | Polymeric Dispersant | BYKJET-9151 (Polyoxyethylene Structure) | Dispex ® Ultra PA 4550 | BYKJET-9170 | Synthetic Polymeric Dispersant B |
|  |  | Quinacridone Pigment | C.I. PR 202/ C.I. PV 19 | C.I. PR 209 | C.I. PR 122 | C.I. PR 122 |

TABLE 3-continued

|  |  |  | Synergist | Sulfonic Acid Derivative of Quinacridone | Synthetic Sulfonic Acid Derivative of 3,10-Dichloroquinacridone | N/A | Synthetic Sulfonic Acid Derivative of 2,9-Dimethylquinacridone |
|---|---|---|---|---|---|---|---|
|  |  | Organic Solvent | Type | 3-Butoxy-N,N-dimethylpropanamide | 3-Methoxy-N,N-dimethylpropanamide | 3-Ethoxy-N,N-dimethylpropanamide | 3-Ethoxy-N,N-dimethylpropanamide |
|  |  |  | Solubility Parameter | 9.03 | 9.19 | 9.13 | 9.13 |
|  |  | Surfactant |  | Zonyl ® FS-300 | Zonyl ® FS-300 | Zonyl ® FS-300 | Zonyl ® FS-300 |
| Ink Composition (g) |  | Pigment Dispersion |  | 30 | 30 | 30 | 30 |
|  |  | Organic Solvent |  | 25 | 65 | 50 | 50 |
|  |  | Surfactant |  | 1 | 1 | 1 | 1 |
|  |  | Ion-exchange Water |  | 44 | 4 | 19 | 19 |
|  |  | Total |  | 100 | 100 | 100 | 100 |
| Ink Heating Treatment Condition |  |  |  | 80° C., 6 hours | 50° C., 48 hours | 60° C., 24 hours | 60° C., 24 hours |

|  |  |  |  | Comparative Example 5 | Comparative Example 6 | Comparative Example 7 |
|---|---|---|---|---|---|---|
|  | Ink Components | Pigment Dispersion | Polymeric Dispersant | Synthetic Polymeric Dispersant A (Polyoxyethylene Structure) | BYKJET-9151 (Polyoxyethylene Structure) | BYKJET-9151 (Polyoxyethylene Structure) |
|  |  |  | Quinacridone Pigment | C.I. PR 122 | C.I. PR 202/ C.I. PV 19 | C.I. PR 202/ C.I. PV 19 |
|  |  |  | Synergist | Synthetic Sulfonic Acid Derivative of 2,9-Dimethylquinacridone | Sulfonic Acid Derivative of Quinacridone | Sulfonic Acid Derivative of Quinacridone |
|  |  | Organic Solvent | Type | 3-Ethoxy-N,N-dimethylpropanamide | 3-Hexyloxy-N,N-dimethylpropanamide | Cyclopentanol |
|  |  |  | Solubility Parameter | 9.13 | 8.96 | 11.87 |
|  |  | Surfactant |  | Zonyl ® FS-300 | Zonyl ® FS-300 | Zonyl ® FS-300 |
|  | Ink Composition (g) | Pigment Dispersion |  | 30 | 30 | 30 |
|  |  | Organic Solvent |  | 50 | 25 | 25 |
|  |  | Surfactant |  | 1 | 1 | 1 |
|  |  | Ion-exchange Water |  | 19 | 44 | 44 |
|  |  | Total |  | 100 | 100 | 100 |
|  | Ink Heating Treatment Condition |  |  | N/A | 80° C., 6 hours | 80° C., 6 hours |

TABLE 4

|  | Storage Stability | | | | | |
|---|---|---|---|---|---|---|
|  | Viscosity Change Rate (%) | D50 Change Rate (%) | D90 Change Rate (%) | Discharge Stability | Beading | Discharge Stability with Circulation Type Discharge head |
| Example 1 | −4.80 | −4.40 | −4.50 | A | A | C |
| Example 2 | −2.40 | −2.30 | −2.20 | A | A | C |
| Example 3 | 0.20 | −0.10 | 0.10 | A | A | C |
| Example 4 | 0.90 | 0.60 | 0.30 | A | A | C |
| Example 5 | −3.30 | −2.90 | −2.30 | A | A | C |
| Example 6 | −3.90 | −3.40 | −3.30 | A | A | C |
| Example 7 | −2.56 | −2.51 | −2.34 | A | A | B |
| Example 8 | −1.86 | −191.00 | −1.82 | A | A | A |
| Example 9 | −2.12 | −2.25 | −2.19 | A | A | B |
| Comparative Example 1 | 0.10 | 0.30 | −0.10 | A | C | D |
| Comparative Example 2 | 10.80 | 12.30 | 11.80 | A | A | D |
| Comparative Example 3 | 146 | 159 | 170 | Unevaluated | Unevaluated | Unevaluated |
| Comparative Example 4 | 126 | 134 | 144 | Unevaluated | Unevaluated | Unevaluated |
| Comparative Example 5 | 13.40 | 15.60 | 14.80 | C | C | D |

TABLE 4-continued

|  | Storage Stability | | | | | |
| --- | --- | --- | --- | --- | --- | --- |
|  | Viscosity Change Rate (%) | D50 Change Rate (%) | D90 Change Rate (%) | Discharge Stability | Beading | Discharge Stability with Circulation Type Discharge head |
| Comparative Example 6 | 56 | 69 | 65 | Unevaluated | Unevaluated | Unevaluated |
| Comparative Example 7 | 23 | 28 | 32 | C | C | D |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An ink comprising:
a quinacridone pigment;
an organic solvent having a solubility parameter of from 9.00 to 11.80 in an amount of from 30% to 60% by mass of total mass of the ink; and
a pigment derivative having a polar group,
wherein both a viscosity change rate and a particle diameter change rate of the ink, before and after the ink is heated at 80° C. for 4 weeks in a sealed state, are in the range of from −5% to 1%.

2. The ink of claim 1, wherein the quinacridone pigment comprises at least one selected from the group consisting of C.I. Pigment Red 122, C.I. Pigment Red 202, C.I. Pigment Red 209, and C.I. Pigment Violet 19.

3. The ink of claim 1, wherein the organic solvent comprises at least one selected from the group consisting of 3-butoxy-N,N-dimethylpropanamide, N,N-dimethyl-3-propanamide, 3-ethoxy-N,N-dimethylpropanamide, 3-methoxy-N,N-dimethylpropanamide, 3-ethyl-3-oxetanemethanol, and 3-methyl-3-oxetanemethanol.

4. The ink of claim 3, further comprising an alkanediol having 5 to 7 carbon atoms.

5. The ink of claim 4, wherein the alkanediol has 6 carbon atoms.

6. The ink of claim 4, wherein a content rate of the alkanediol in the ink is in the range of from 5% to 30% by mass.

7. The ink of claim 1, wherein the pigment derivative having a polar group comprises a sulfonic acid derivative of quinacridone.

8. The ink of claim 1, further comprising a dispersant having a polyoxyethylene structure.

9. A method for producing an ink according to claim 1, the method comprising:

heating a raw material mixture of the ink, the raw material mixture comprising a quinacridone pigment and an organic solvent having a solubility parameter of from 9.00 to 11.80.

10. An ink storage container comprising:
a container; and
the ink of claim 1 stored in the container.

11. A recording device comprising:
an ink discharger to discharge the ink of claim 1 onto a recording medium to record information or an image on the recording medium.

12. The recording device of claim 11, wherein the ink discharger comprises:
an ink discharge head comprising:
a nozzle to discharge the ink;
a plurality of individual liquid chambers in communication with the nozzle;
a flow-in channel to let the ink flow into the individual liquid chambers; and
a flow-out channel to let the ink flow out of the individual liquid chambers; and
a negative pressure generator to generate a negative pressure to let the ink flow out of the individual liquid chambers.

13. A recording method comprising:
applying a stimulus to the ink of claim 1 through an ink discharger; and
discharging the ink from the ink discharger to record information or an image on a recording medium.

14. The recording method of claim 13, the discharging comprises:
letting the ink flow into an individual liquid chamber from a flow-in channel;
generating a negative pressure; and
letting the ink flow out of the individual liquid chamber into a flow-out channel by action of the negative pressure.

15. The ink of claim 7, wherein the pigment derivative is selected from the group consisting of a sulfonic acid derivative of 2,9-dimethylquinacridone, a sulfonic acid derivative of 3,10-dichloroquinacridone, a sulfonic acid derivative of 2,9-dichloroquinacridone, and a sulfonic acid derivative of unsubstituted quinacridone.

16. The ink of claim 1, wherein the pigment derivative comprises a quinacridone derivative.

* * * * *